United States Patent [19]
Ito et al.

[11] Patent Number: 5,581,135
[45] Date of Patent: Dec. 3, 1996

[54] SUPERCONDUCTING MOTOR

[75] Inventors: Yoshitaka Ito; Yousuke Yanagi; Tetsuo Oka; Ryohei Yabuno; Shintaro Harada; Tutomu Sakakibara, all of Kariya, Japan

[73] Assignee: IMRA Material R & D Co., Ltd., Kariya, Japan

[21] Appl. No.: 304,214

[22] Filed: Sep. 12, 1994

[30] Foreign Application Priority Data

Sep. 15, 1993 [JP] Japan ................................ 5-253802
Aug. 9, 1994 [JP] Japan ................................ 6-209253

[51] Int. Cl.$^6$ .................................................. H02K 9/00
[52] U.S. Cl. ............................... 310/52; 310/54; 505/166
[58] Field of Search .................................. 505/166, 876, 505/877; 310/52, 54

[56] References Cited

U.S. PATENT DOCUMENTS 3,521,091  7/1970  Halas .
5,177,054  1/1993  Lloyd et al. ........................... 505/1

FOREIGN PATENT DOCUMENTS 289344  12/1991  Japan .
1501624  2/1978  United Kingdom .

OTHER PUBLICATIONS

Database Japan, vol. 16, No. 120 (E–1182), JP–3–289344, Dec. 19, 1991.
Patent Abstracts of Japan, vol. 13, No. 490, Nov. 7, 1989, JP–A–1–194855, Aug. 4, 1989.
Patent Abstracts of Japan, vol. 14, No. 374, Aug. 13, 1990, JP–A–2–136061, May 24, 1990.

*Primary Examiner*—Steven L. Stephan
*Assistant Examiner*—John C. Butler
*Attorney, Agent, or Firm*—Oblon, Spivak, McClelland, Maier & Neustadt, P.C.

[57] ABSTRACT

A superconducting motor comprising an armature provided on a rotative shaft, magnet portions disposed opposite to said armature, coolant containers for containing said magnet portions and coolant, coolant pipes connected to said coolant containers for supplying the coolant, wherein each of said magnet portions comprises a superconductor and a magnetizing coil wound around it and wherein lead wires for supplying a pulse current for magnetization are connected to said magnetizing coils.

26 Claims, 23 Drawing Sheets

□ : 35V, + : 30V, ◇ : 25V,
△ : 20V, × : 15V, ○ : 10V

SUPERCONDUCTING MOTOR

BACKGROUND OF THE INVENTION

1. Field of the Invention

The present invention relates to a superconducting motor utilizing bulk-shaped superconductors.

2. Description of the Related Art

The device disclosed in Japanese unexamined patent publication No. 289344/1991 has been known as a superconducting motor.

This superconducting motor is comprised of a shaft, a disk-shaped armature secured to the shaft and superconducting coils disposed opposite to the armature. The superconducting coils also have a container for liquid helium and a radiation shield.

This superconducting motor is of a type wherein a magnetic field generated from the excited superconducting coil provides the armature with a torque.

Specifically, the superconducting coils have been cooled by liquid helium below the critical temperature thereof and are in a superconducting state. Therefore, the superconducting coils are easily excited by supplying an electric current thereto so that they are turned into magnets having a high magnetic flux density.

However, the above-described superconducting motor has problems as follows. First, quenching may occur at the superconducting coils. The term "quenching" means a phenomenon that a normal conducting area which has been locally generated expands continuously causing the entire superconductor to be rapidly transformed into a normal conducting state. Such quenching results from applying a current and/or a magnetic field higher than a critical current and/or a critical magnetic field specific to the superconductor. Further, such quenching is likely to occur especially in wires.

In addition, a superconductor has an electric resistance in the normal conducting state. Therefore, Joule heat is generated corresponding to an electric current flowing therein.

Therefore, when quenching occurs in the superconducting coils of the above-described superconducting motor, the Joule heat generated from the coils can cause the liquid helium to boil, resulting in damages in the liquid helium container etc. due to an increase in the pressure therein. The Joule heat can also melt down the coils themselves.

Accordingly, the output of the conventional superconducting motor as described above is limited because attention must be paid to quenching. This also adversely affects its efficiency.

Further, the boiling point of liquid helium is as low as about 4K. So, the liquid helium container must have a special adiabatic mechanism. Specifically, the special adiabatic structure must be provided, wherein liquid nitrogen is circulated around the container with a vacuum adiabatic layer interposed therebetween; a vacuum portion is provided at the outer periphery thereof; and, in addition, a radiation shield is provided so that it covers the entire container. Therefore, the above-described superconducting motor has a complicated structure and results in a large-sized apparatus.

In addition, since liquid helium is expensive, the operating cost of the superconducting motor is increased.

Furthermore, since the conventional superconducting motor as de scribed above has a complex structure, it is difficult to take apart and put together when maintenance and check is needed, and therefore, it is poor in operation.

SUMMARY OF THE INVENTION

The present invention confronts the problems as described above, and it is an object of the present invention to provide a superconducting motor which is free from quenching in the superconductors therein and which provides high efficiency and readiness in taking apart and putting together.

The present invention provides a superconducting motor comprising an armature provided on a rotative shaft, magnet portions disposed opposite to the armature, coolant containers for containing the magnet portions and coolant, and coolant pipes connected to the coolant containers for supplying the coolant, wherein each of the magnet portions comprises a superconductor and a magnetizing coil wound around it and wherein lead wires for supplying a pulse current for magnetization are connected to the magnetizing coils.

DETAILED DESCRIPTION OF THE INVENTION

According to the first aspect of the present invention, there is provided a superconducting motor comprising an armature provided on a rotative shaft, magnet portions disposed opposite to the armature, coolant containers for containing the magnet portions and coolant and coolant pipes connected to the coolant containers for supplying the coolant, wherein each of the magnet portions comprises a superconductor and a magnetizing coil wound around it and wherein lead wires for supplying a pulse current for magnetization are connected to the magnetizing coils.

The most important feature of the first aspect of the present invention is that each magnet portion is constituted by a superconductor and a magnetizing coil wound around it and that a pulse current is used for magnetization.

The pulse current is periodically supplied to the magnetizing coils. The period depends on the superconductor used, the desired motor output and the like but the pulse current is preferably applied at intervals of several minutes to several months. The power source for the pulse current is provided outside the superconducting motor.

Figure 7:
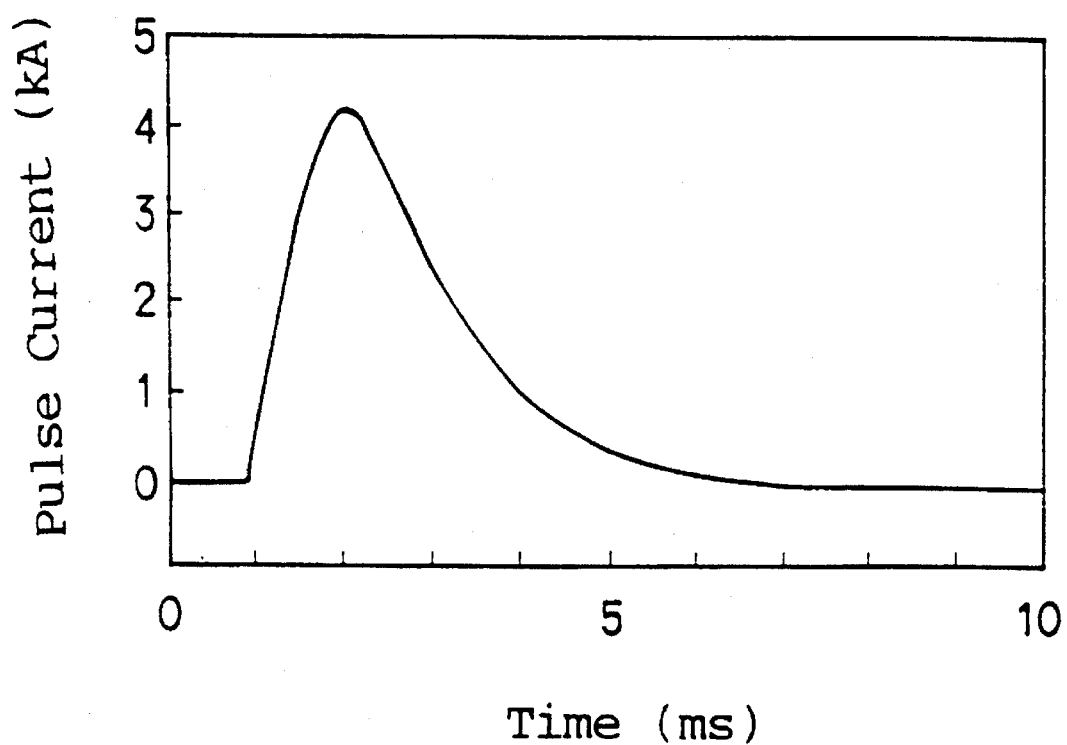
FIG. 7 illustrates a pulse current flowing through magnetizing coils of the superconducting motor according to the first embodiment of the present invention.

It is preferred that the wave width of the pulse current is moderately small, and further, the peak height of the pulse is moderately high (see FIG. 7).

It is preferred that the direction of magnetization of the superconductors is such that the magnetic flux of the superconductors is perpendicular to the armature. The magnetic flux of the superconductors disposed adjacent to each other in the circumferential direction of the armature is preferably in the form of a closed curve (see FIG. 4).

There are two kinds of coolant pipes, i.e., one for supplying and the other for discharging the coolant to and from the coolant container. For example, the coolant pipes are provided separately. Alternatively, they are provided as an integral structure by arranging them into a coaxial two-pipe system.

The magnet portions are disposed on one or both sides of the armature.

One or a plurality of magnet portions are disposed in the rotational direction of the armature. It is preferred that the magnet portions are provided in an even number in the rotational direction of the armature in order to prevent the magnetic flux of the superconductors from leaking to the outside.

The greater the number of the magnet portions is, the greater the output of the motor. However, since the apparatus becomes larger with an increase in number of the magnet portions, the configuration of the magnet portions must be selected to meet the purpose.

The magnetizing coil may be a normal copper electrical wire but is preferably made of a superconducting wire.

The material of the superconducting wire may be any superconductor which remains in a superconducting state at the temperature of the coolant used and which can be processed as a wire material.

When the coolant is liquid nitrogen, Bi-based superconductors are preferred from the viewpoint of cost.

When the magnetizing coil is a superconductor, no heat will be generated even if it is energized. It is therefore possible to prevent temperature rise at the magnet portions etc.

The lead wires connected to the magnetizing coils are preferably spirally twisted together. It is preferred that the two lead wires, i.e., one extending toward the magnetizing coils and the other coming out from the magnetizing coils, are twisted together.

The current flows through the two going and returning lead wires are opposite to each other and, therefore, a repulsive force is produced between these lead wires when a puls current flows therein, whch causes the lead wires to vibrate.

The lead wires also produce magnetic fields around them. However, since the current flows through these lead wires in opposite directions, the magnetic field around the two lead wires is canceled by twisting them.

Therefore, the vibration of the two lead wires and the generation of magnetic field can be avoided by twisting the lead wires together as described above. Next, the lead wires are preferably routed through the coolant pipes. The electric resistance of the lead wires is reduced by cooling the wires. This makes it possible to minimize the generation of Joule heat when they are energized. Therefore, there will be no increase in the ambient temperature due to heat generated at the lead wires.

The surfaces of the lead wires are preferably coated with a low-temperature resistant material.

The superconductor used is in the form of a bulk (in the form of a solid piece). The materials for such superconductors include RE—Ba—Cu—O (RE is one or a plurality of elements selected from among a group consisting of Y, Nd, Sm, Eu, Gd, Dy, Ho, Er, Tm, Yb and Lu), Bi—(Pb)—Sr—Ca—Cu—O, Tl—Ba—Ca—Cu—O, and Hg—Ba—Ca—Cu—O.

Especially, the superconductor is preferably made of a superconducting oxide including Y, Ba and Cu, and is preferably produced by a melt-processing technique.

The above-described superconducting materials have critical temperatures of 90K or higher. It is therefore possible to achieve a superconducting state using a coolant such as liquid nitrogen which is inexpensive and which can be readily obtained.

The above-described RE—Ba—Cu—O superconductor provides a significant pinning effect which allows a larger amount of magnetic flux to be fixed to a pinning point. This improves the performance of a superconducting motor.

The coolant is preferably a liquid coolant selected from among a group consisting of liquid nitrogen, liquid argon, liquid air, liquid oxygen, liquid methane, and liquid krypton.

The boiling points of the above substances at a pressure of 1 atm are 77K, 87K, 79K, 90K, 112K and 120K, respectively. It is apparent that they are sufficiently higher than the boiling point of 4K of liquid helium. Therefore, it is not necessary to provide the coolant containers, coolant pipes, etc. with any special adiabatic mechanism.

Liquid nitrogen and liquid air have another advantage in that they are inexpensive.

The coolant may be any substance which has a boiling point higher than that of liquid helium and lower than the critical temperature of the superconductors used in the magnet portions and which preferably has the heat of vaporization greater than that of liquid helium.

The temperature of the coolant may be decreased to a value equal to or lower than the boiling point by reducing the pressures inside the coolant container and the coolant pipes by making use of a characteristic of a coolant that the temperature thereof is decreased when the pressure is reduced.

The temperature of the coolant can be decreased by reducing the pressure thereof to a triple point at which the solid, liquid and gas of the coolant coexist.

Specifically, the temperatures of liquid nitrogen, liquid argon, liquid oxygen, liquid methane and liquid krypton can be decreased to 63K, 84K, 54K, 91K and 116K, respectively, while they remain in a liquid phase and, therefore, they can be used as liquid coolants.

The coolant may be a gas coolant selected from among a group consisting of cooled helium gas, hydrogen gas and neon gas.

The amount of such a gas coolant required to fill the coolant container is smaller than that required for a liquid coolant. Further, since gas has lower viscosity, the diameter of the pipes for circulating the coolant and the like can be reduced. This allows a space saving and a reduction in weight in the superconducting motor compared to using a liquid coolant.

Helium gas is hard to liquify and is therefore excellent as a gas coolant.

The gas coolant is preferably cooled by a refrigerator and is circulated between the refrigerator and the coolant container. The purpose is to prevent temperature rise at the gas coolant. This arrangement makes it possible to always keep the temperature of superconductors constant.

The coolant container is preferably disposed in a vacuum container. This further improves the adiabatic characteristic of the coolant container.

In a superconducting motor according to the present invention, a magnet portion is constituted by a superconductor and a magnetizing coil wound around it and is magnetized by a pulse current.

As a result, magnetic flux generated in the magnetizing coil is fixed to the superconductor of the magnet portion. In other words, the superconductors can be magnetized without applying an electric current to them. This prevents electrical disturbances in the superconductors. In addition, since each of the superconductors is in bulk form, quenching will not occur.

The magnetizing coil generates a magnetic field when a pulse current is applied. The current is applied for a very short time. Further, the magnetizing coil is in a coolant to be cooled and, therefore, it has small electric resistance. Thus, the Joule heat generated is very small, and vaporization of the coolant can be suppressed to a very small amount.

Since the electric resistance of the magnetizing coil is reduced as described above, the capacity of the power supply to supply the pulse current can be reduced to allow a reduction in the size of the same.

These are the points on which the superconducting motor according to the present invention is essentially different from the prior art wherein the magnetic fields are generated from the superconducting coils themselves to cause operations of a motor.

The magnitude of the magnetic fields fixed to the superconductors depends on the magnetic fields generated by the magnetizing coils. Therefore, the magnitude of the magnetic fields of the superconductors can be controlled by changing the magnitude of the pulse current applied to the magnetizing coils. This allows simple control over the output of the motor and consequently efficient operations.

As described above, the present invention provides a superconducting motor which has no quenching at the superconductors therein and which can be operated efficiently.

According to the second aspect of the present invention, there is provided a superconducting motor comprising a motor body and a first and a second coolant tanks for storing coolant; wherein the motor body comprising an armature provided on a rotative shaft, magnet portions disposed opposite to the armature, coolant containers for containing the magnet portions and coolant and coolant pipes connected to the coolant containers for supplying the coolant, wherein each of the magnet portions comprises a superconductor and a magnetizing coil wound around it and wherein lead wires for supplying a pulse current for magnetization are connected to the magnetizing coils; and wherein the coolant containers mounted on each side of the armature are connected to the first and the second coolant tanks respectively by means of coolant circulating pipes and wherein each of the coolant circulating pipes comprises a supplying coolant pipe for supplying the coolant to each of the coolant container from the first or the second coolant tank and a discharging coolant pipe provided at the outer periphery of the supplying coolant pipe to leave a spacing therebetween for discharging the coolant into the first or second coolant tank from each of the coolant containers.

The most important feature of the second aspect of the present invention is that each magnet portion is constituted by a superconductor and a magnetizing coil wound around it, that a puls current is used for magnetization and that each of the coolant containers provided on both sides of the armature are connected to the first or second coolant tank respectively.

The pulse current is periodically supplied to the magnetizing coils. The period depends on the superconductor used, the desired motor output and the like but the pulse current is preferably applied at intervals of several minutes to several months. The power source for the pulse current is provided outside the superconducting motor.

Figure 22:
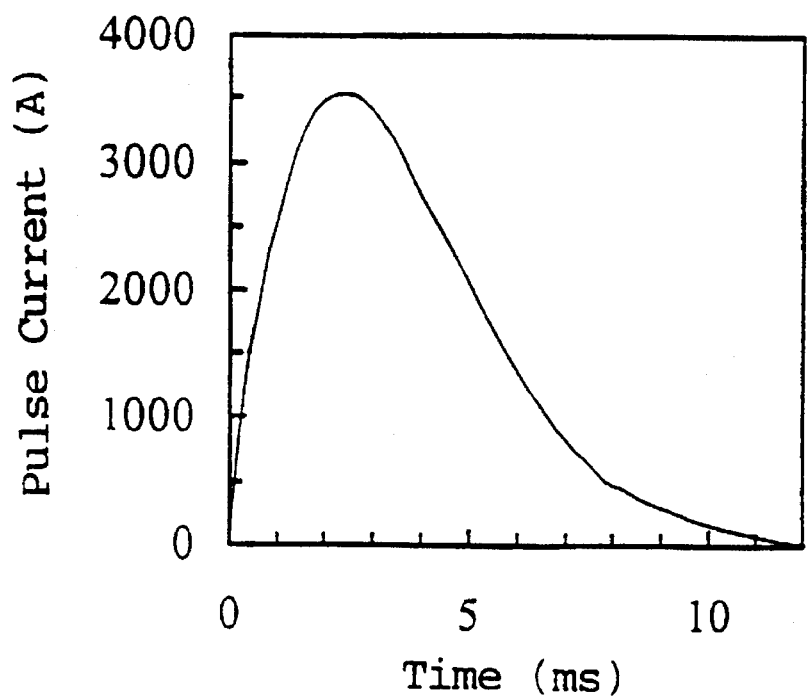
FIG. 22 illustrates a pulse current flowing through magnetizing coils of the superconducting motor according to the third embodiment of the present invention.

It is preferred that the wave width of the pulse current is moderately small, and further, the peak height of the pulse is moderately high (see FIG. 22).

It is preferred that the direction of magnetization of the superconductors is such that the magnetic flux of the superconductors is perpendicular to the armature. The magnetic flux of the superconductors disposed adjacent to each other in the circumferential direction of the armature is preferably in the form of a closed curve (see FIG. 12).

Figure 20:
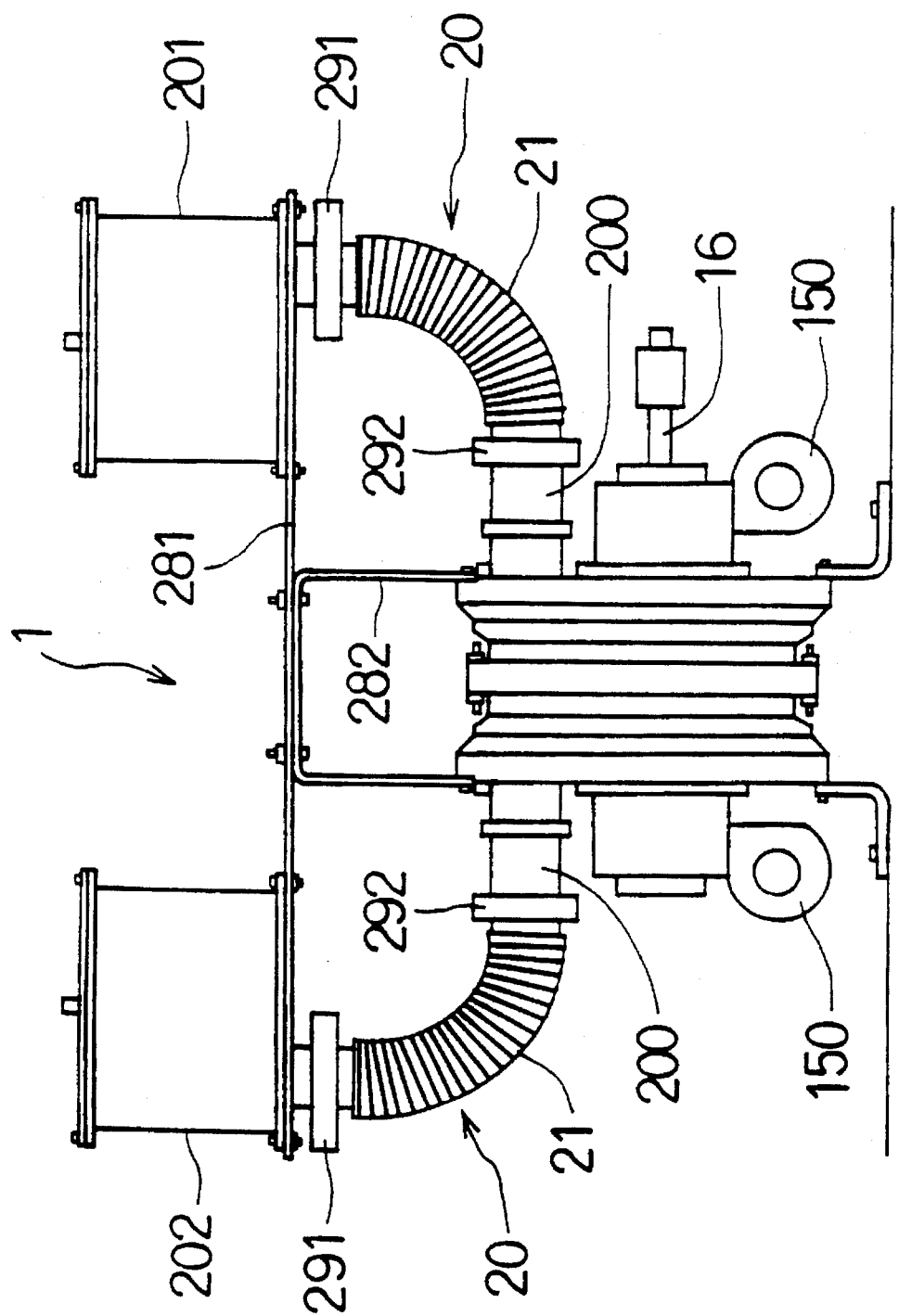
FIG. 20 is a front view of the superconducting motor according to the third embodiment of the present invention.

The first and the second coolant tanks are provided separately from the motor body and are fixed, for example, on a prop, a stand and the like provided on the top of the motor body (see FIG. 20).

Each of the coolant circulating pipes is constituted by a supplying and a discharging coolant pipes, wherein a supplying coolant pipe is for supplying coolant to a coolant container from the first or the second coolant tank and the coolant flowing through it has a low temperature and is, for example, in a liquid phase as described later.

The coolant's temperature, however, increases while the coolant circulates through the coolant container, and the coolant is partly vaporized to be a gas coolant. Since the gas coolant's temperature is too high to cool the magnet portions, it is discharged and collected into the first or the second coolant tank.

In each of the coolant circulating pipes, a supplying and a discharging coolant pipes are provided as doubl-piped. Specifically, the discharging coolant pipe is provided at the outer periphery of the supplying coolant pipe to allow a gas coolant to flow through it.

This prevents outside heat from conducting to the supplying coolant pipes and, therefore, allows the coolant temperature to be kept low.

It is preffered that the first and the second coolant tanks are provided respectively on the top of the motor body.

It is also preffered that a bellows-shaped outer tube is provided at the outer periphery of each of the discharging coolant pipes with an insulating material interposed therebetween.

As described above, the temperature of a coolant and a coolant gas flowing through a supplying and a discharging coolant pipes are by far lower than room temperature. What is more, in order to maintain the superconducting state of a superconducting motor, the temperature of a coolant must be kept below the critical temperature of the superconductor thereof. Therefore, it is essential to shield the coolant from outside heat.

Consequently, if an insulting material is provided at the outer periphery of a discharging coolant pipe, it is possible to prevent temperature increase of a coolant in a supplying coolant pipe arranged inside the discharging coolant pipe.

Superinsulation, forming material and the like are preferably used as an insulting material. FRP material which has low heat conductivity is preferably used as supporting parts with which a discharging coolant pipe is fixed to portions at room temperature such as an outor tube and the like.

An vacuum layer provided outside of a discharging coolant pipe can be a substitution for an insulting material. A vacuum layer can also be provided with an insulting material interposed between the layer and an outer tube.

When the outer tube is bellows-shaped, it has a lot of flexibility and pliability, and therefore each of the first and the second coolant tanks can be connected to a motor body more freely. Specifically, in whatever direction coolant tanks are, it can be connected to the motor body. Furhermore, taking apart and putting together of coolant circulating pipes can be done more easily.

It is preferred that the motor body has a nozzle which is connected to the coolant circulating pipes, wherein a point of a supplying coolant pipe goes through the nozzle and opens into a coolant container and a discharging coolant pipe is removably fitted with the nozzle.

This allows a superconducting motor to be easily taken apart and put together.

In a motor body, a nozzle is preferably fitted to a coolant container by means of welding.

In addition, it is preferd that the nozzle and the discharging coolant pipe are connected through a connecting pipe, wherein each connection between the nozzle and the connecting pipe and between the nozzle and the discharging coolant pipe are done by means of a fitting tube. The fitting tube is constituted by screw-in type parts, therefore, it can be easily taken apart or put together even in a small place, and what is more, without any special tools.

A gas coolant discharged into the coolant tanks is preferably cooled in a refrigerator and circulated between the refrigerator and the coolant tanks. The purpose is to prevent temperature rise of the gas coolant. This makes it possible to always keep temperature of superconductors constant.

The other configuration of a superconducting motor of the second aspect of the present invention is the same as that of the first aspect of the present invention.

In a superconducting motor according to the second aspect of the present invention, each of magnet portions is constituted by a superconductor and a magnetizing coil wound around it and is magnetized by a pulse current.

As a result, magnetic flux generated in the magnetizing coils is fixed to the superconductosr of the magnet portions. In other words, the superconductors can be magnetized without applying an electric current thereto. This prevents electrical disturbances in the superconductors. In addition, since each of the superconductors is in bulk form, quenching will not occur.

In the superconducting motor, the first and the second coolant tanks are provided separately from a motor body and each of them is connected to coolant container provided on the both sides of the armature with coolant circulating pipes. This arrangement allows the coolant tanks to be mounted in any directions relative to the motor body. Therefore, the superconducting motor can be easily taken apart or put together.

Each of the coolant circulating pipes is double-piped and a discharging coolant pipe is provided at the outer periphery of a supplying coolant pipe. The purpose of this arrangement is to discharge and collect a gas coolant vaporized in a coolant container to coolant tanks, and further, to insulate the supplying coolant pipe from the outside heat by means of the mixture of the coolant and the gas coolant in the discharging coolant pipe.

The magnetizing coil generates a magnetic field when the pulse current is applied. The current is applied for a very short time. Further, the magnetizing coil is in a coolant to be cooled and, therefore, it has small electric resistance. Thus, the Joule heat generated is very small, and vaporization of the coolant can be suppressed to a very small amount.

Since the electric resistance of the magnetizing coils is reduced as described above, the capacity of the power supply to supply the pulse current can be reduced to allow a reduction in the size of the same.

These are the points on which the superconducting motor according to the present invention is essentially different from the prior art wherein the magnetic fields are generated from the superconducting coils themselves to cause operations of a motor.

The magnitude of the magnetic fields fixed to the superconductors depends on the magnetic fields generated by the magnetizing coils. Therefore, the magnitude of the magnetic fields of the superconductors can be controlled by changing the magnitude of the pulse current applied to the magnetizing coils. This allows simple control over the output of the motor and consequently efficient operations.

As described above, the present invention provides a superconducting motor which has no quenching at superconductors therein and which can be easily taken apart and put together, and what is more, operated efficiently.

DETAILED DESCRIPTION OF THE PREFERRED EMBODIMENTS

Embodiment 1

A superconducting motor of a first embodiment of the present invention will now be described with reference to FIG. 1 through FIG. 7.

Figure 1:
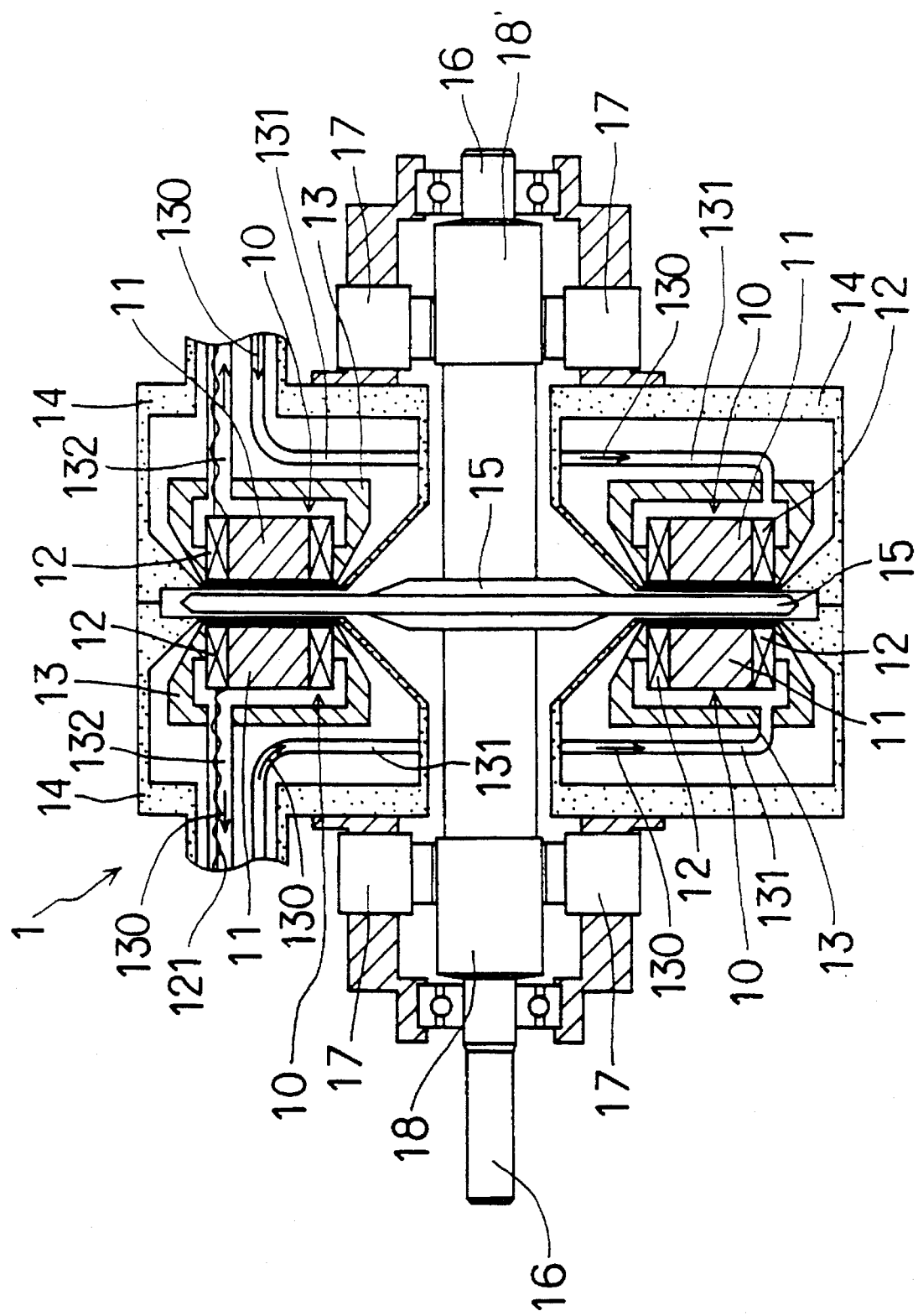
FIG. 1 is a sectional view of a superconducting motor according to a first embodiment of the present invention.

As shown in FIG. 1, a superconducting motor 1 of the present embodiment comprises an armature 15 provided on a rotative shaft 16, magnet portions 10 disposed opposite to the armature 15, coolant containers 13 for containing the magnet portions 10 and a coolant 130 and coolant pipes 131 connected to the coolant containers 13 for supplying the coolant. Each of the magnet portions 10 is constituted by a superconductor 11 and a magnetizing coil 12. Lead wires 121 for supplying a pulse current for magnetization are connected to the magnetizing coils 12.

The rotative shaft 16 on which the armature 15 is provided has brushes 17 for supplying electric current from the outside. The brushes 17 are disposed opposite to commutators 18.

Figure 3:
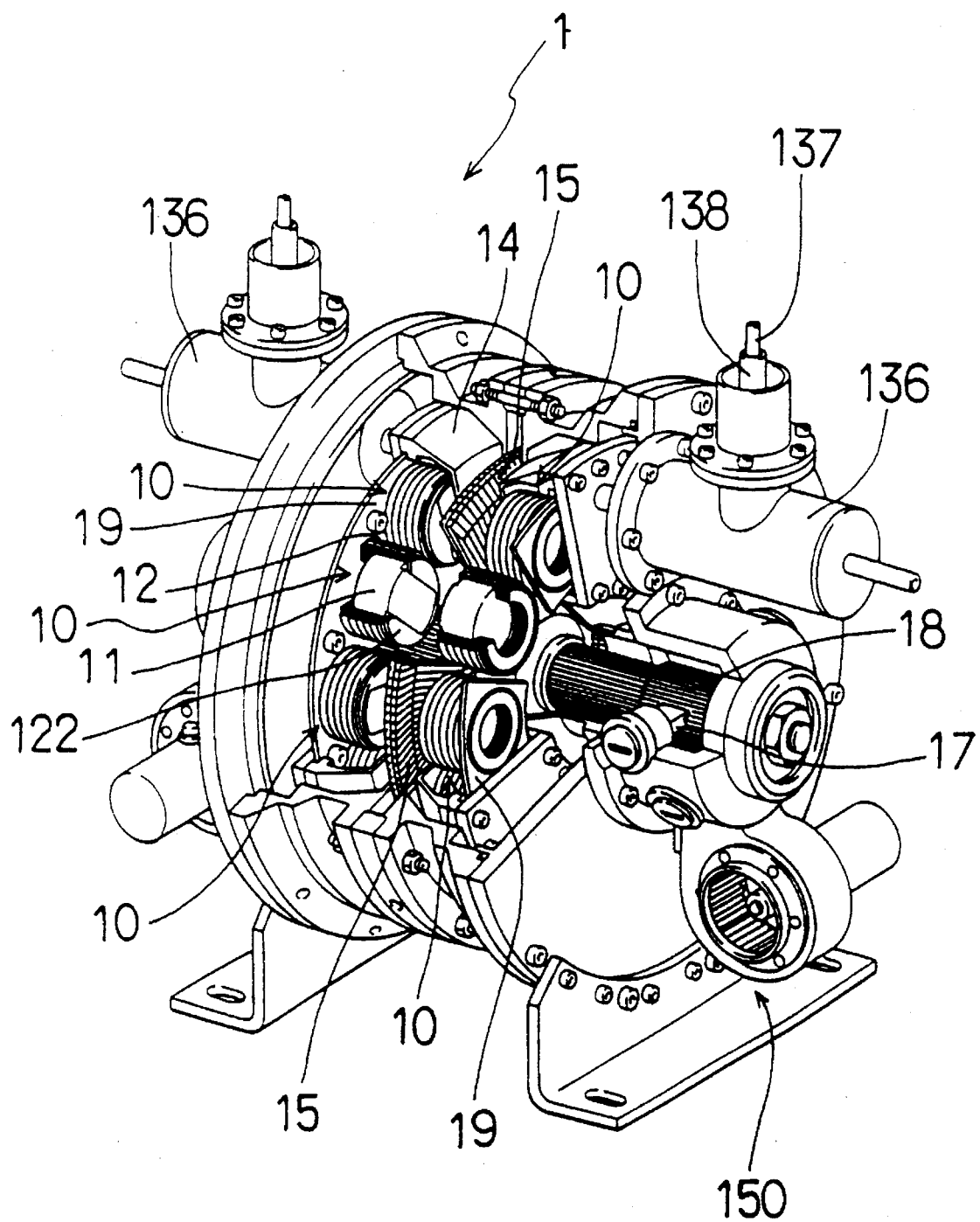
FIG. 3 is an overall perspective view of the superconducting mo tor according to the first embodiment of the present invention.

In FIG. 3, the reference number 150 designates a blower for blowing air into the armature 15 to cool it.

As shown in FIG. 1 through FIG. 4, the magnet portions 10 are disposed on both sides of the armature 15 so that they face each other with the armature 15 sandwiched therebetween. As shown in FIG. 3, ten magnet portions 10 are disposed at equal intervals in the rotational direction of the armature 15. In other words, the superconducting motor 1 in the present embodiment has twenty magnet portions 10 in total.

Figure 2:
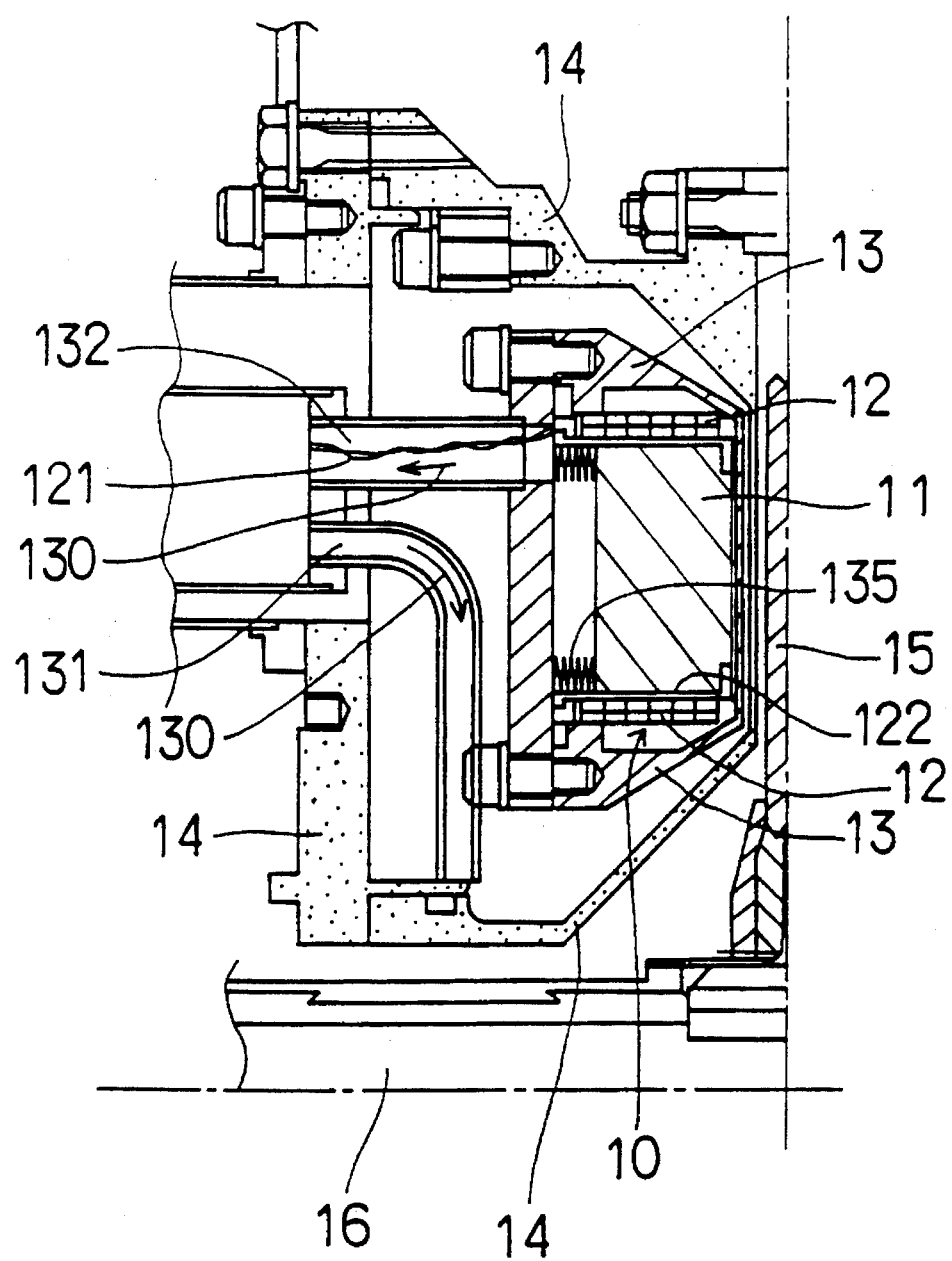
FIG. 2 is an enlarged view of major parts in FIG. 1.

As shown in FIG. 2, each of the magnet portions 10 is constructed by providing a bulk shaped superconductor 11 in a bobbin 122 and by winding the magnetizing coil 12 around the bobbin 122.

In FIG. 2, the reference number 135 designates a spring for urging the superconductor 11 toward the armature 15.

Figure 4:
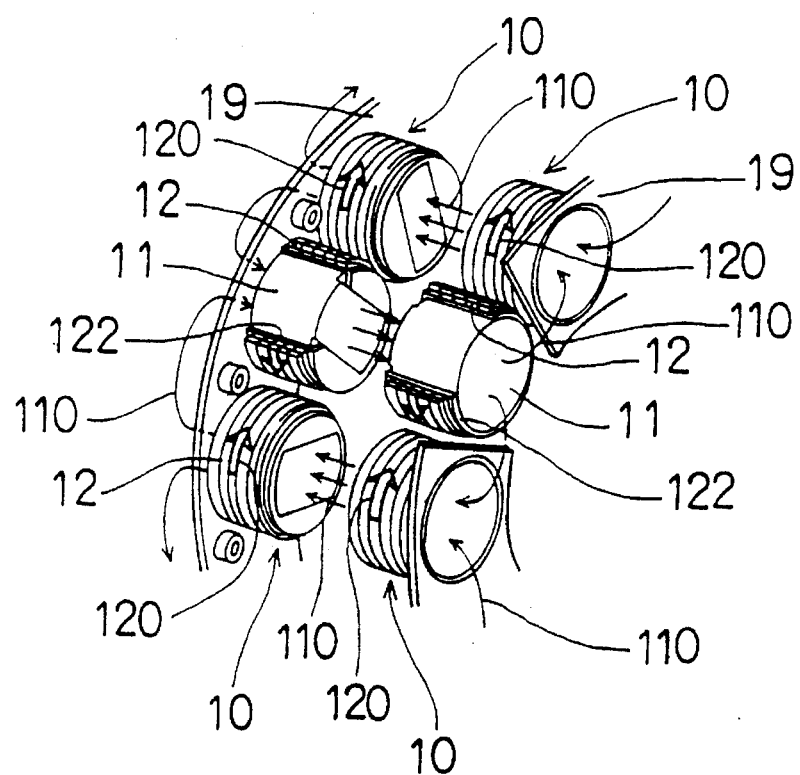
FIG. 4 illustrates magnet portions of the superconducting motor according to the first embodiment of the present invention.
Figure 6:
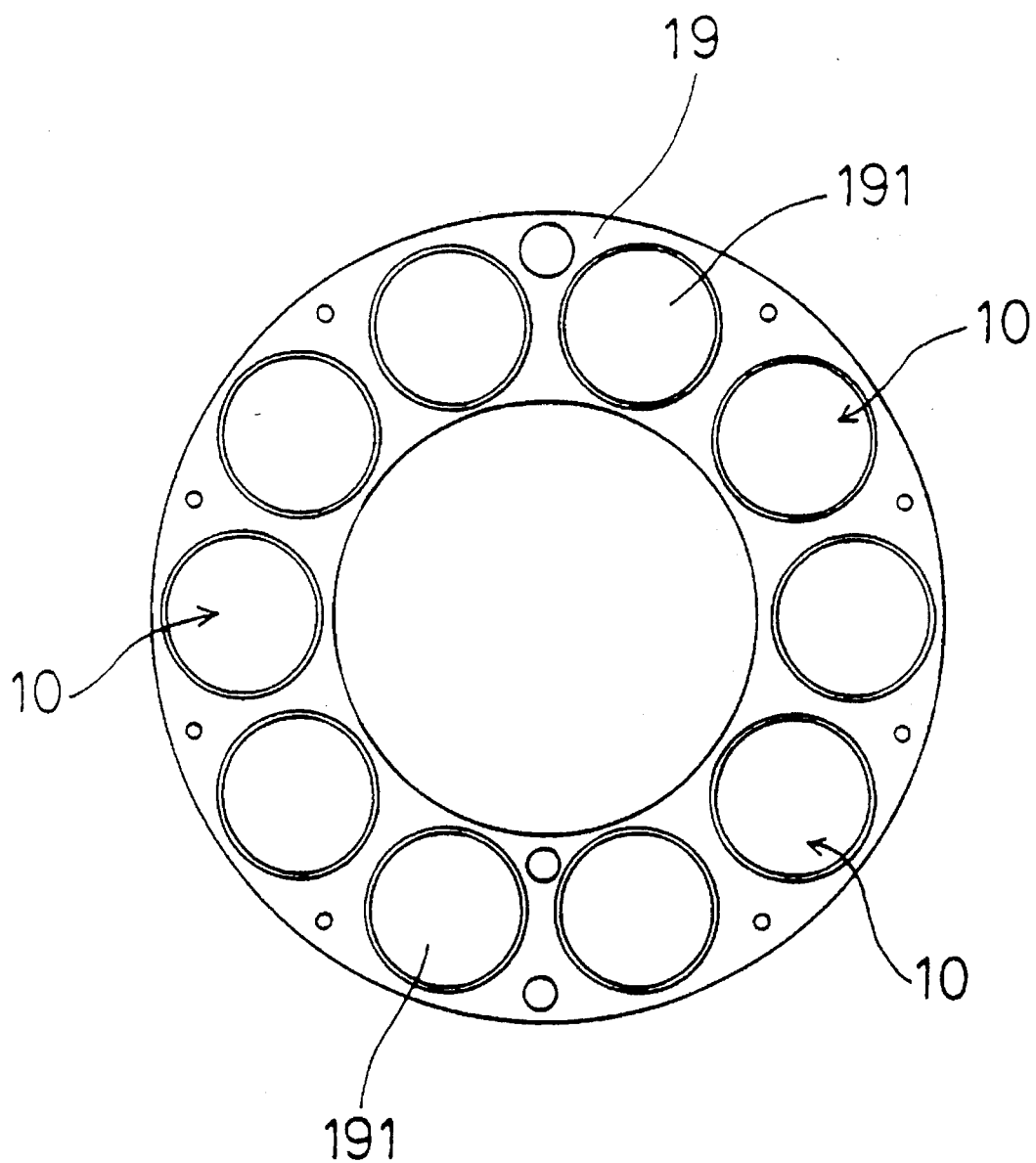
FIG. 6 is a rear view of a base of the superconducting motor ac cording to the first embodiment of the present invention.

As shown in FIG. 3, FIG. 4 and FIG. 6, the magnet portions 10 are secured to a base 19 provided coaxially with the armature 15.

As shown in FIG. 6, the base 19 is in the form of a ring and has loading portions 191 on which the magnet portions 10 are placed.

As shown in FIG. 2, one of the lead wires 121 extends toward the magnetizating coils 12 and the other comes out therefrom. These wires are spirally twisted together and are routed through a discharging coolant pipe 132.

As shown in FIG. 1 through FIG. 4, the coolant container 13 is disposed in a vacuum container 14. The supplying coolant pipe 131 and the discharging coolant pipe 132 are connected to the coolant container 13. The supplying coolant pipe 131 and the discharging coolant pipe 132 are provided as separate elements. The supplying coolant pipe 131 is connected from the rear surface of the base 19.

The reference number 136 in FIG. 3 designates a coolant subtank storing portion. The supplying coolant pipe 131 and the discharging coolant pipe 132 are connected to a coolant subtank in the storing portion. The subtank is also provided with a supplying coolant pipe 137 and a discharging coolant pipe 132 connected to a main tank.

Liquid nitrogen is used as the coolant 130.

Each superconductor 11 is in the form of a cylindrical bulk (see FIG. 1 through FIG. 4). The superconductors 11 are made of a superconducting material including fine grains of $Y_2BaCuO_5$ among larger crystal grains of $YBa_2Cu_3O_{7-\delta}$ produced by a melt-processing technique.

Figure 5:
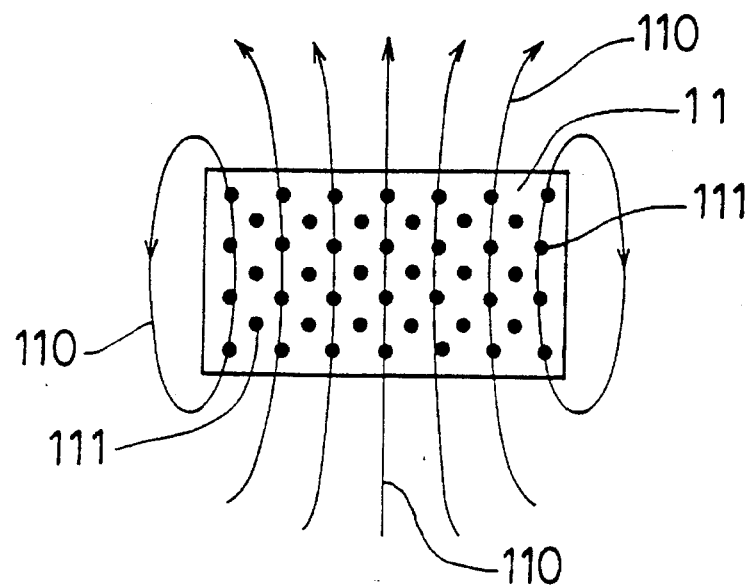
FIG. 5 illustrates pinning of magnetic flux in a superconductor of the superconducting motor according to the first embodiment of the present invention.

The critical temperature of the superconducting material is about 90K. Since each superconductor 11 has a pinning point 111 for trapping magnetic flux 110 as shown in FIG. 5, it is preferable as a magnetic element for a motor. Each magnetizing coil 12 is ten turns of a square copper wire having a cross section of 3mm×1.2mm.

The advantages of the present embodiment will now be described.

As shown in FIG. 1 through FIG. 3, in the superconducting motor 1 of the present embodiment, the coolant container 13 is filled with liquid nitrogen through the supplying coolant pipe 131. As a result, the superconductors 11 of the magnet portions 10 are cooled below the critical temperature thereof. The magnetizing coils are similarly cooled.

Next, the pulse current 120 is supplied by a pulse current source (see FIG. 4). This produces magnetic fields in the magnetizing coils 12, and the magnetic flux 110 generated by the magnetic fields is fixed to the pinning points 111 of the superconductors 11 (see FIG. 5). The superconductors 11 are thus magnetized.

When the motor is being driven, electric current is supplied from a current source to the armature 15 through the brushes 17 and the commutators 18. A Lorentz force acts on the current through the armature 15 by means of the magnetic flux 110 from the superconductors 11. In other words, the directions of the electric current flowing through the disc-shaped armature 15 are divided into the same number of portions as the magnetic portions 10, and the current of each portion flows alternately in the radial direction so that it produces a torque in the same direction one another. This causes the armature 15 to rotate, making it possible to take out the motor output through the rotative shaft 16 connected to the armature 15.

The coolant 130 returns from the coolant container 13 to a coolant supplying portion through the discharging coolant pipe 132. It is cooled there again and fed to the superconducting motor 1 again through the supplying coolant pipe 131.

FIG. 4 shows how the superconductors 11 are magnetized by applying the pulse current 120. As shown in FIG. 4, the flowing direction of the pulse current 120 is the same at the magnetizing coils 12 facing each other on both sides of the armature 15 while the current flows in opposite directions at the magnetizing coils 12 ad joining each other in the circumferential direction of the armature 15.

As a result, the magnetic flux 110 generated from the magnetized superconductors 11 is perpendicular to the armature 15 between the superconductors 11 facing each other on both sides of the armature 15 and is in the form of a closed curve among the superconductors 11 adjoining each other in the circumferential direction of the armature 15.

Accordingly, the superconductors 11 are magnetized by the magnetizing coils 12 in the directions as shown in FIG. 4. The direction of the magnetic flux 110 is fixed. This prevents the magnetic flux 110 from leaking to the outside. It is therefore possible to efficiently fix the magnetic flux 110 to the superconductors 11.

As shown in FIG. 5, the magnetic flux 110 produced by the pulse current 120 is fixed to the pinning points 111 in the superconductors 11. This makes it possible to magnetize the superconductors 11 without applying electric current to the superconductors 11. Therefore, no quenching occurs in the superconductors 11.

FIG. 7 shows the waveform of the pulse current 120 flowing through the magnetizing coils 12.

As shown in FIG. 7, the rising time of the pulse 120 is 1 ms and the current disappears 10 ms later. Since the current flows through the magnetizing coils 12 for a very short time, only a small amount of Joule heat is generated and boiling of the coolant can be avoided.

The magnetic fields at the superconductors 11 magnetized by the pulse current 120 are attenuated over time. So, the pulse current 120 is applied to the magnetizing coils 12, for example, every 30 minutes. Thus, the superconductors 11 always maintain large magnetic flux.

The pulse current 120 is supplied from an external pulse current source. This makes it possible to control the magnetic fields at the superconductors 11 through the external pulse current source. Therefore, the motor can be efficiently operated independently of the pulse power source. By controlling the magnitude of the magnetic fields, desired motor output can be obtained.

The critical temperature of the superconductors 11 used in the present embodiment is about 90K. It is therefore possible to use liquid nitrogen as the coolant 130. Liquid nitrogen is inexpensive and easy to handle. Thus, a superconducting motor 1 which requires low operating cost and has a simple structure can be obtained.

Therefore, the present embodiment provides an efficient superconducting motor free from quenching at the superconductors therein.

Embodiment 2

Figure 8:
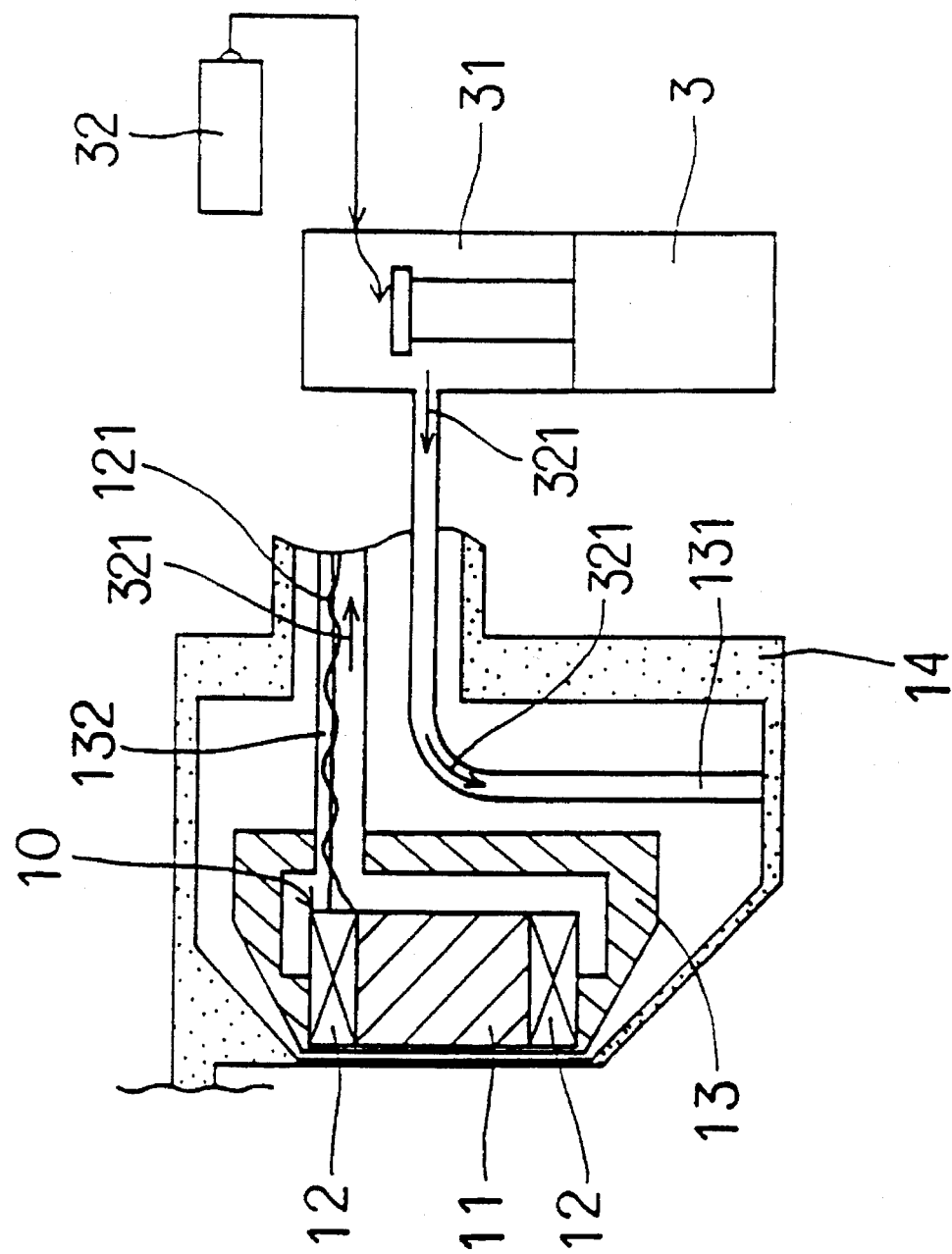
FIG. 8 illustrates major parts of a superconducting motor according to a second embodiment of the present invention.

FIG. 8 shows a second embodiment of the present invention wherein a gas coolant 321 is used for cooling the superconductors 11.

The gas coolant 321 is supplied by a coolant tank 32 provided externally to the superconducting motor and is cooled at a cooling portion 31 provided in the refrigerator 3. After being cooled down to a desired temperature, the gas coolant 321 is sent to the coolant container 13 through the supplying coolant pipe 131 as in the first embodiment.

After cooling the superconductors 11 etc., it is discharged through the discharging coolant pipe 132 and is sent to the refrigerator 3. The gas coolant 321 is circulated between the refrigerator 3 and the coolant container 13.

Helium gas is used as the gas coolant 321.

The advantages of the present embodiment will now be described.

In the present embodiment, since the gas coolant 321 is used, the coolant container 13 is filled with an amount of the coolant which is smaller than that in the case of a liquid coolant. Further, since gas has low viscosity, the supplying and discharging coolant pipes 131 and 132 can be of a type having a diameter smaller than that for a liquid coolant. This allows a space saving of tne superconducting motor.

The gas coolant 321 is circulated between the coolant container 13 and the refrigerator 3 to maintain the superconductors 11 etc. at a constant temperature.

The other advantages of the present embodiment are the same as those in the first embodiment.

Embodiment 3

A superconducting motor of a third embodiment of the present invention will now be described with reference to FIG. 9 through FIG. 22.

As shown in FIGS. 9, 18 through 20, a superconducting motor 1 of the present embodiment comprises a motor body 100 and the first and the second coolant tanks respectively 201 and 202.

The motor body 100 comprises an armature 15 provided on a rotative shaft 16, magnet portions 10 disposed opposite to the armature 15, a coolant containers 13 for containing the magnet portions 10 and a coolant 130 and coolant circulating pipes 20 connected to the coolant containers 13 for supplying the coolant.

Each of the magnet portions 10 is constituted by a superconductor 11 and a magnetizing coil 12 wound around it. And as described later, lead wires 121 for supplying a pulse current for magnetization are connected to the magnetizing coils 12.

Figure 18:
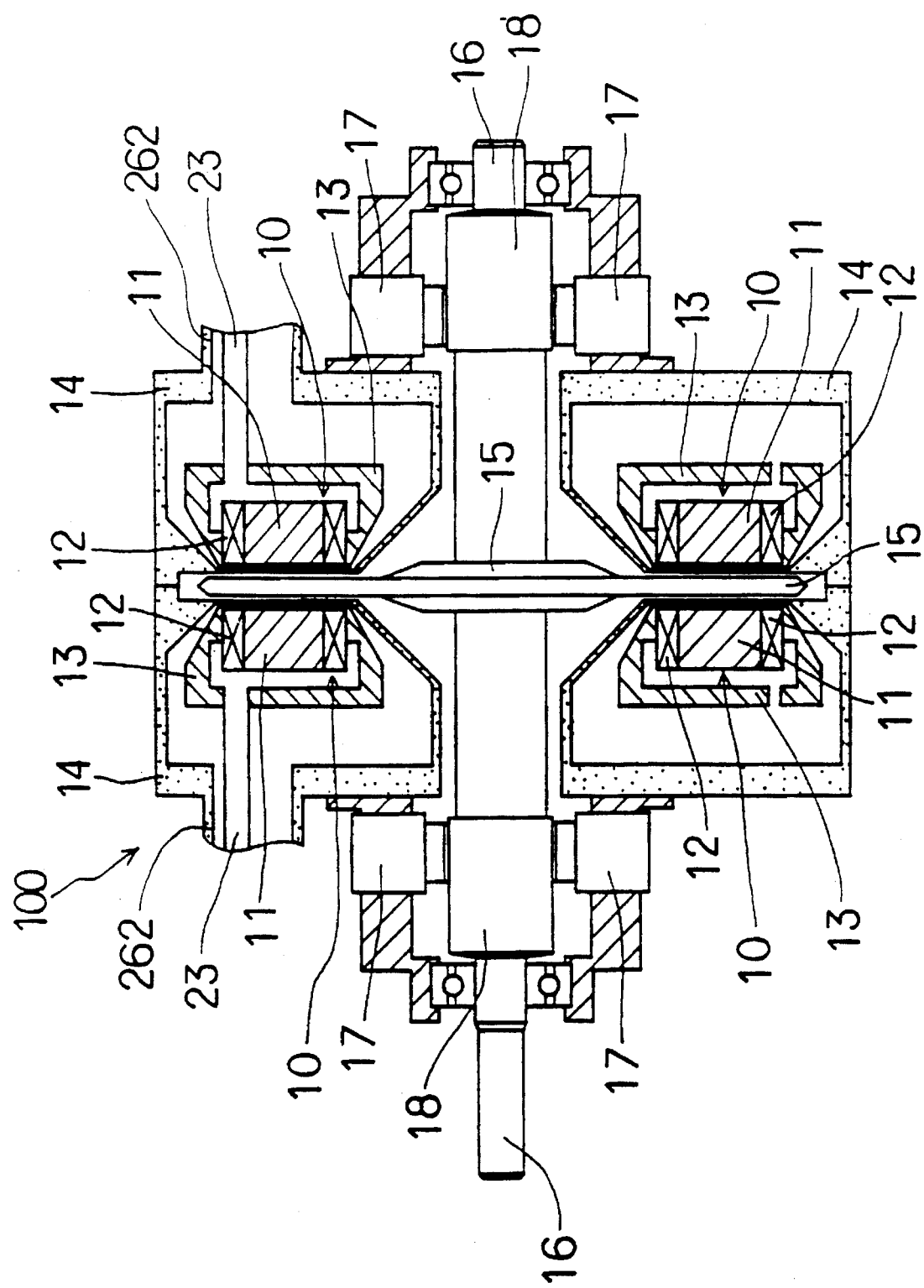
FIG. 18 illustrates an overall sectional view of a body of the superconducting motor according to the third embodiment of the present invention.
Figure 19:
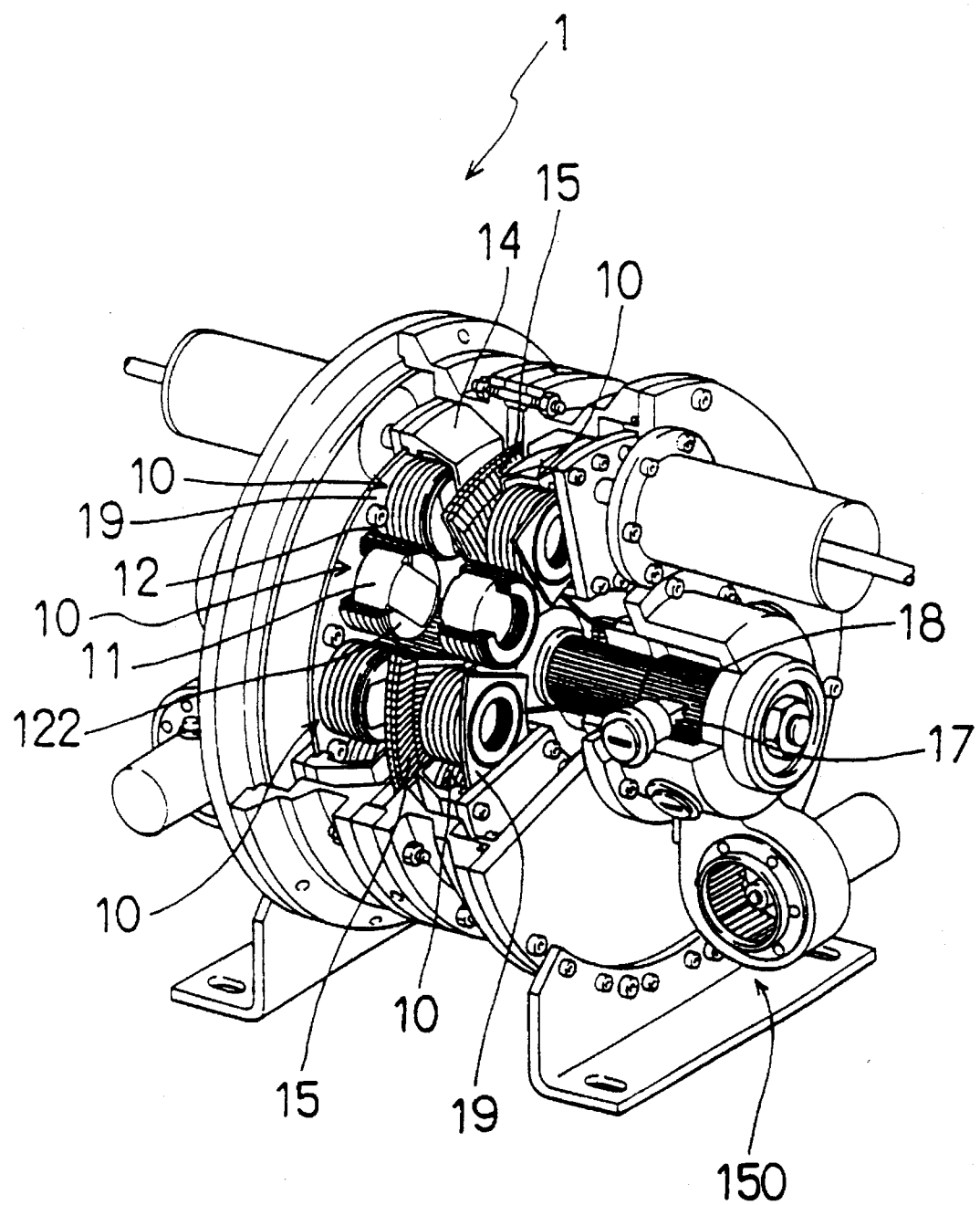
FIG. 19 is a perspective view of the body of the superconducting motor according to the third embodiment of the present invention.

As shown in FIGS. 18 through 20, the coolant container 13 provided on one side of the armature 15 (FIG. 9 and right half of each of FIGS. 18 through 20) and that on the other side of the armature 15 (left half of each of FIGS. 18 through 20) are connected respectively to the first and the second coolant tank 201, 202 through the coolant circulating pipe 20.

Figure 9:
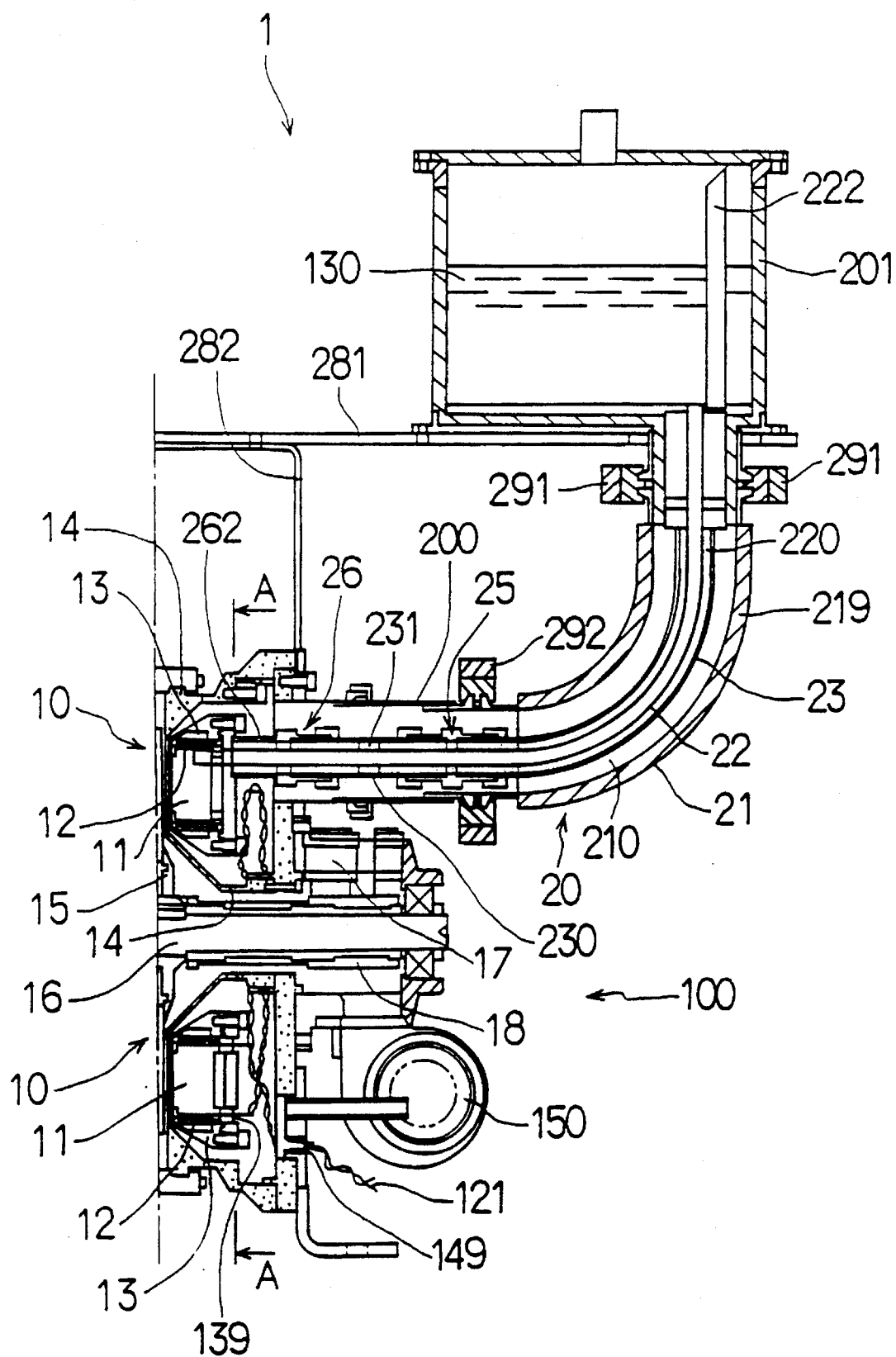
FIG. 9 is a sectional view of right half of a superconducting motor according to a third embodiment of the present invention.
Figure 11:
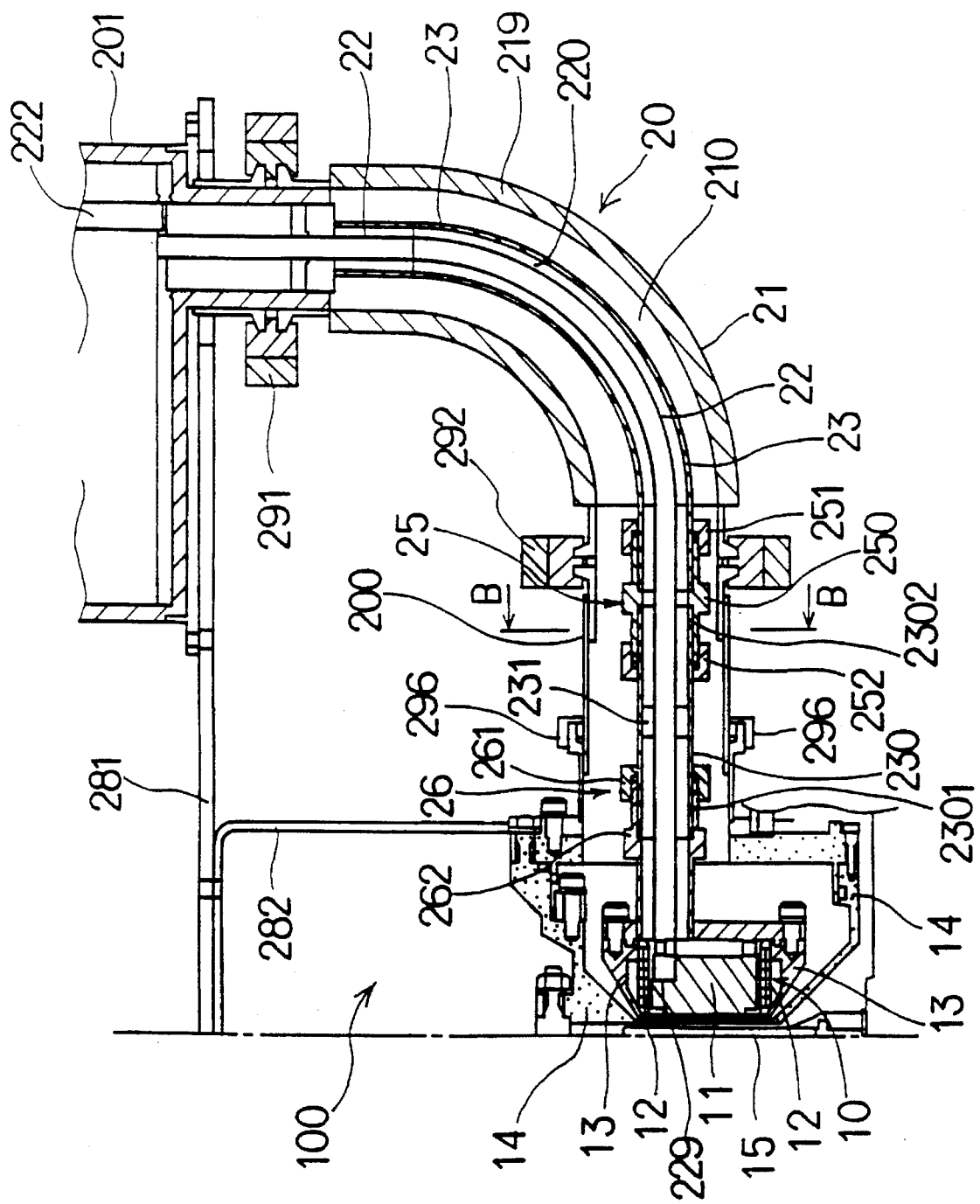
FIG. 11 is a sectional view of a coolant circulating pipe of the superconducvting motor according to the third embodiment of the present invention.

As shown in FIGS. 9 and 11, the coolant circulating pipe 20 consists of a supplying coolant pipe 22 for supplying the coolant 130 from the first and second coolant tanks 201, 202 to the coolant container 13 and a discharging coolant pipe 23 for discharging the coolant from the coolant container 13 into the first and second coolant tanks 201, 202.

Further description of a superconducting motor according to the present embodiment will now be given.

First the motor body 100 will be described.

As shown in FIGS. 9, 18 through 20, a rotative shaft 16 on which the armature 15 is provided has brushes 17 for supplying electric current from the outside. The brushes 17 are disposed opposite to commutators 18. In FIGS. 9, 19 and 20, the reference numbers 150, 222, 281 and 282 designate respectively a blower for blowing air into the armature 15 to be cooled, a nozzle for discharging a coolant, a stand on which the first and second coolant tanks 201, 202 are placed and a prop for propping the stand 281.

Figure 12:
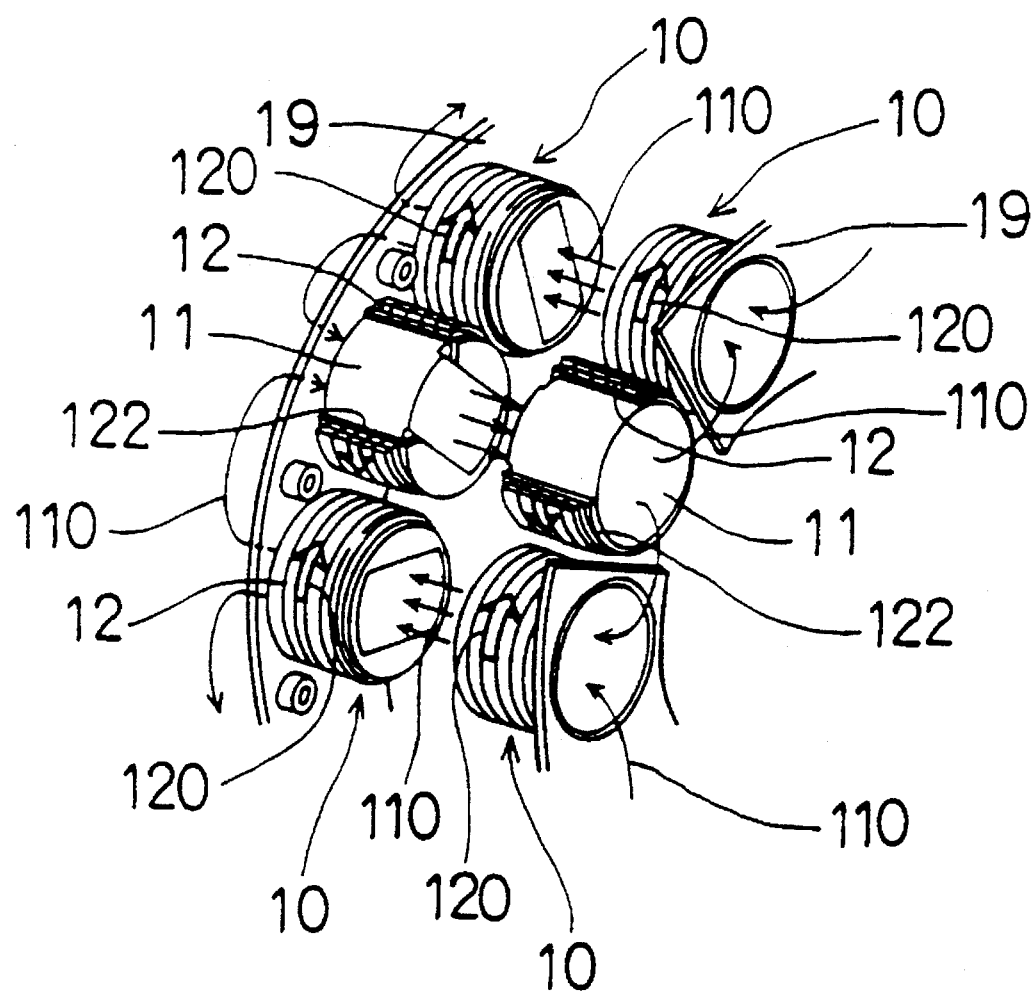
FIG. 12 illustrates magnet portions of the superconducting motor according to the third embodiment of the present invention.
Figure 13:
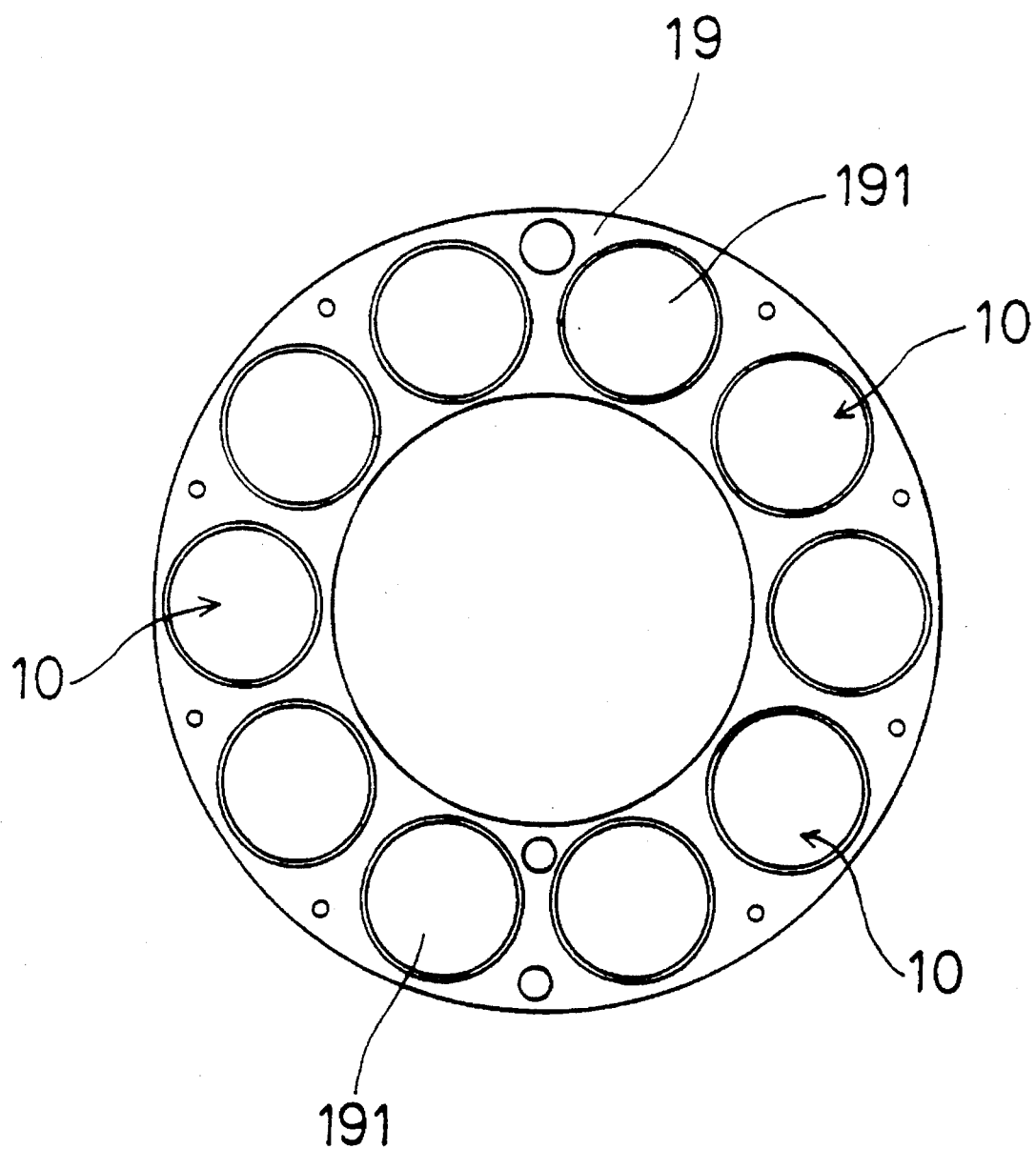
FIG. 13 is a rear view of a base of the superconducting motor according to the third embodiment of the present invention.

As shown in FIGS. 18 and 19, the magnet portions 10 are disposed on both sides of the armature 15 so that they face each other with the armature 15 sandwiched therebetween. As shown in FIG. 12, the magnet portions 10 are secured to a base 19 provided coaxially with the armature 15. The base 19 is in the form of a ring and has loading portions 191 on which the magnet portions 10 are placed. As shown in FIG. 13, ten magnet portions 10 are disposed at equal intervals in the rotational direction of the armature 15. In other words, the superconducting motor 1 in the present embodiment has twenty magnet portions 10 in total.

Figure 17:
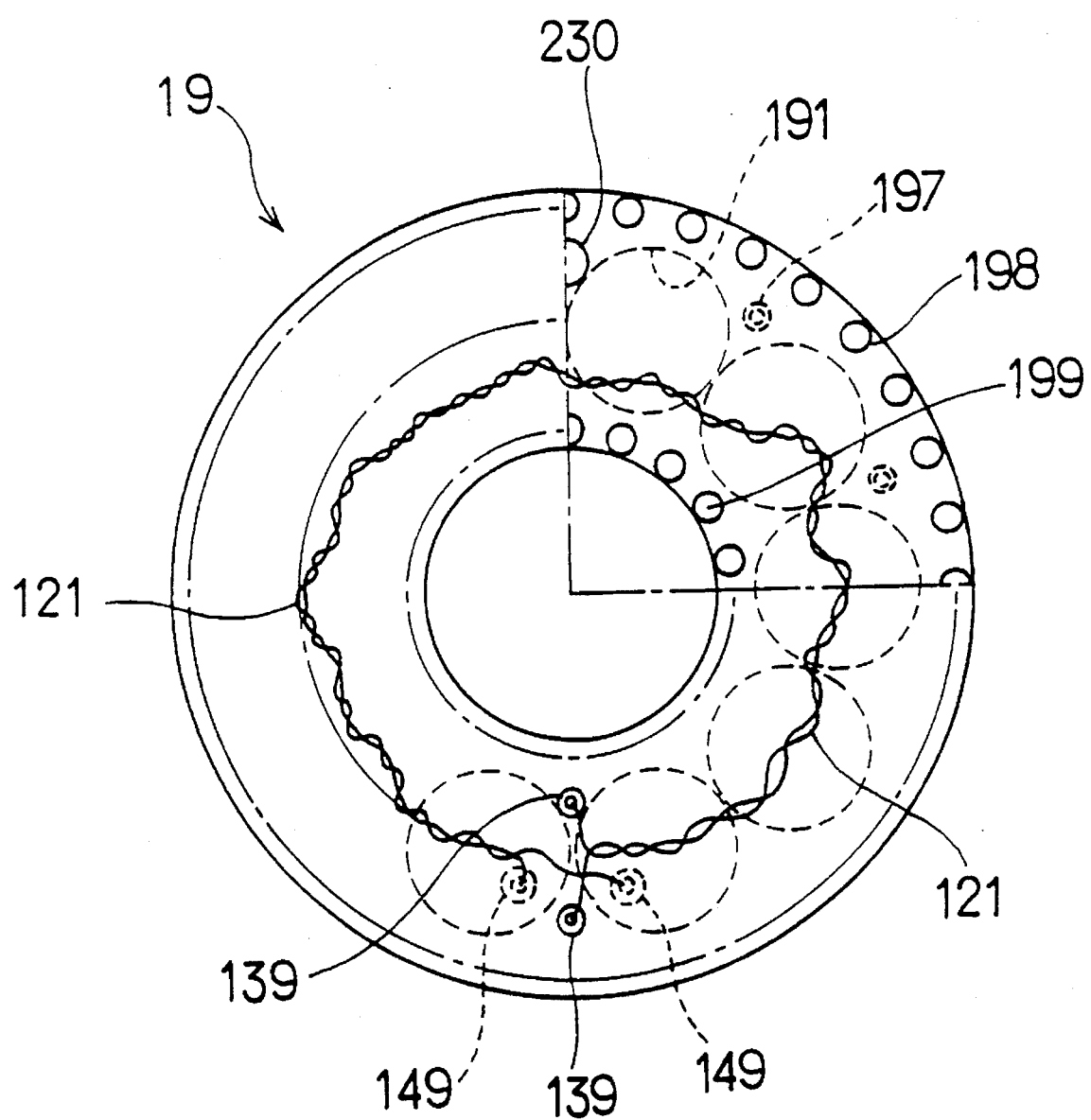
FIG. 17 is a sectional view taken substantially along the line A—A of FIG. 9.

As shown in FIGS. 9 and 17, lead wires 121 for supplying a pulse current from an outside current source to magnetizing coils 12 are connected to the magnetizing coils 12 of the magnet portions 10 through the lower part of the coolant container 13. The magnetizing coils 12 are connected in series with the winding direction of the magnetizing coils alternately reversed.

As shown in FIGS. 9 and 17, the lead wires 121 are routed through hermetic seal 139 secured to the coolant container 13 to the vacuum container 14 and then through hermetic seal 149 secured to the vacuum container 14 to the outside of the motor. The going and returning wires of the lead wires 121 within the vacuum container 14 are twisted together in a insulating state. Further, the wires are kept long enough to have a loop-shaped slack so as to suppress inflow of outside heat to a minimum.

In FIG. 17, the reference number 197 designates a hole for screwing down the base 19 inside of the coolant container 13, and the numbers 198 and 199 each designate a hole for screwing down the lid of the coolant container 13.

When the lead wires 121 remain twisted together, wire breaking can be avoided. Specifically, when a large electric current is applied to the magnetizing coil 12, even though it is a pulse current, an electromagnetic force generated therein acts repulsively between the going and returning lead wires. As a result, the lead wires 121 in the vacuum container 14 vibrates violently and this can cause the wires to be cut or non-insulated. This phenomenon, however, can be suppressed by twisting the wires together. In addition, if the distance between the two ends of the lead wires 121, namely, the one end at room temperature and the other at that of liquid nitrogen, are kept moderately long, an inflow of outside heat and a frost formation on the hermetic seal 149 provided on the vacuum container 14 can be suppressed.

The magnet portions 10 will now be described.

Figure 10:
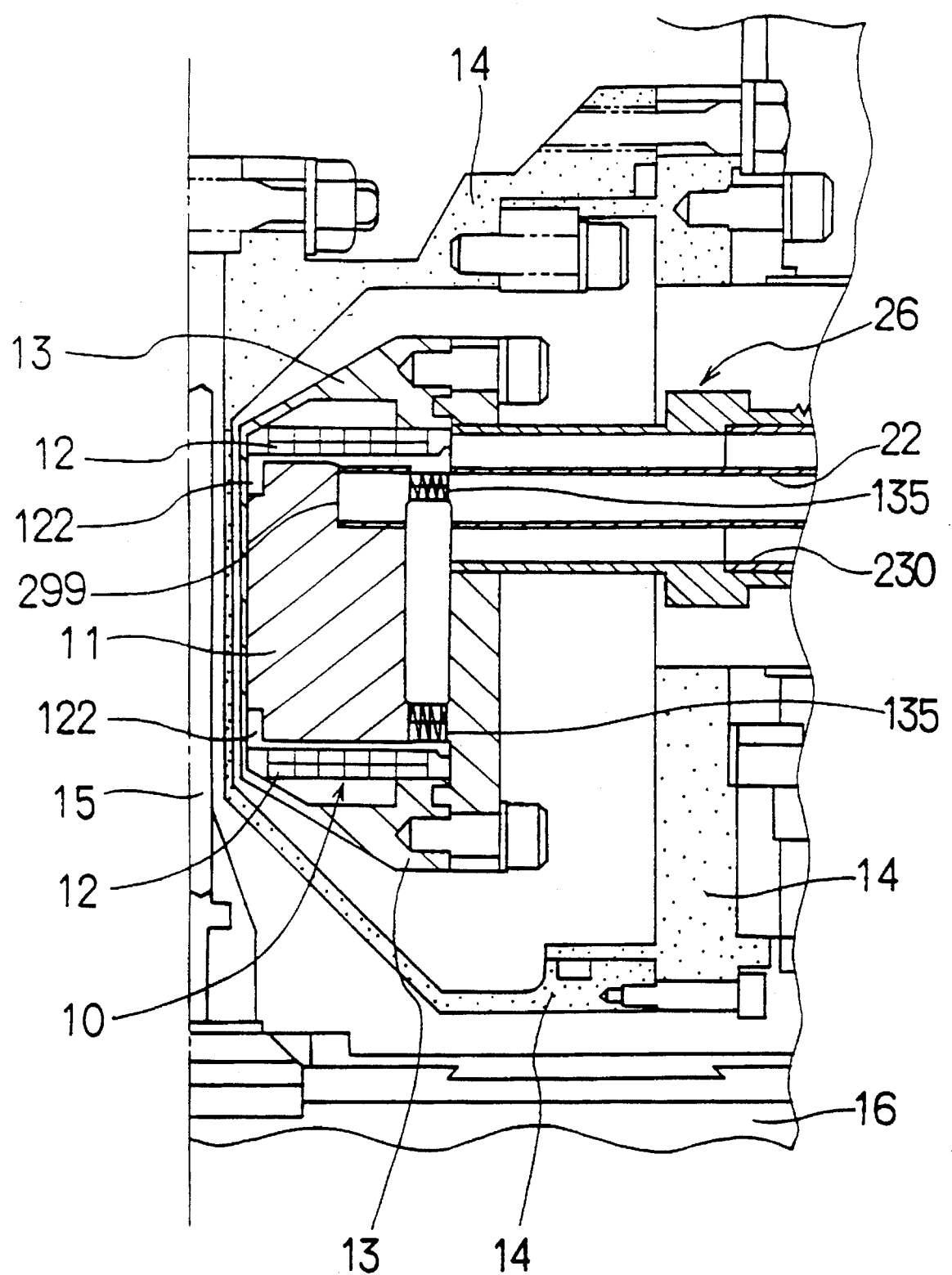
FIG. 10 is a sectional view of a magnet portion of the superconducting motor according to the third embodiment of the present invention.

As shown in FIG. 10, each of the magnet portions 10 is constructed by providing a bulk shaped superconductors 11 in a bobbin 122 and by winding the magnetizing coil 12 around the bobbin 122. The reference number 135 designates a spring for urging the superconductor 11 toward the armature 15.

The coolant container 13 is disposed in a vacuum container 14. The coolant circulating pipe 20 is connected to the coolant container 13. As shown in FIG. 9, the supplying coolant pipe 22 and the discharging coolant pipe 23 of the coolant circulating pipe 20 are connected to the rear surface of the base 19 (the surface opposite to that facing the armature 15).

Liquid nitrogen is used as the coolant 130.

Each superconductor 11 is in the form of a cylindrical bulk. The superconductors 11 are made of a superconducting material including fine grains of Y2BaCuO5 among larger crystal grains of YBa2Cu3O7-δ produced by a melt-processing technique.

Figure 21:
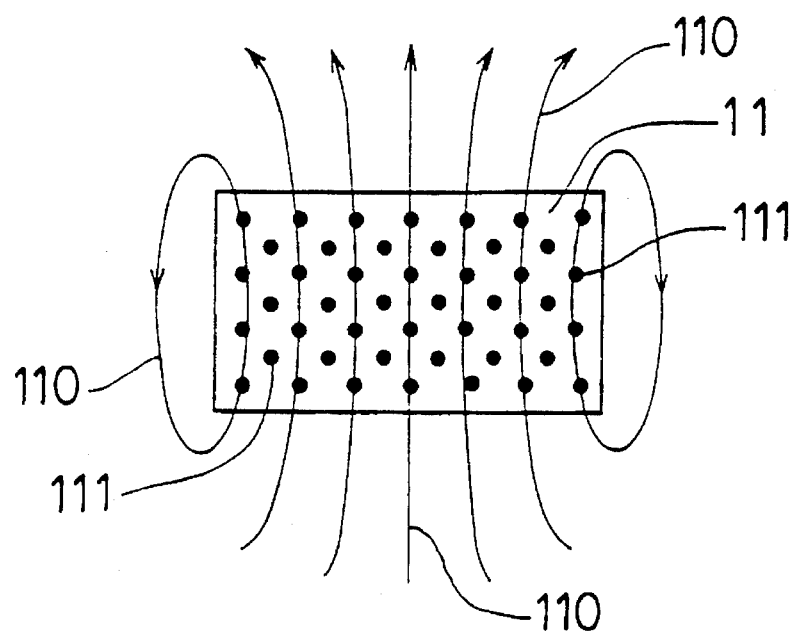
FIG. 21 illustrates pinning of magnetic flux in a superconductor of the superconducting motor according to the third embodiment of the present invention.

The critical temperature of the superconducting material is about 90K. Since each superconductor 11 has a pinning point 111 for trapping magnetic flux 110 as shown in FIG. 21, it is preferable as a magnetic element for a motor. Each magnetizing coil 12 is ten turns of a square copper wire having a cross section of 3mm×1.2mm.

The way the coolant container 13 and the first coolant tank 201 are connected through a coolant circulating pipe 20 will now be described.

Although the following description does not refer to the second coolant tank 202, since the superconducting motor 1 of the present embodiment has symmetrical structure as shown in FIG. 18, the folowing description covers the case of the second coolant tank 202.

As shown in FIGS. 9, 11, 15 and 20, the coolant circulating pipe 20 comprises two coaxial pipes, an inner pipe or a supplying coolant pipe 22 and an outer pipe or a discharging coolant pipe 23, wherein a vacuum portion 210 are provided at the outer periphery of the discharging coolant pipe 23, and further, a bellows-shaped outer pipe 21 is provided at the outer periphery of the vacuum portion 210 with an insulating material 219 interposed therebetween (see FIG. 12). Further, a hollow layer 220 is provided between the supplying and the discharging coolant pipes 22, 23 for dischaging a coolant into the first coolant tank 201.

Figure 15:
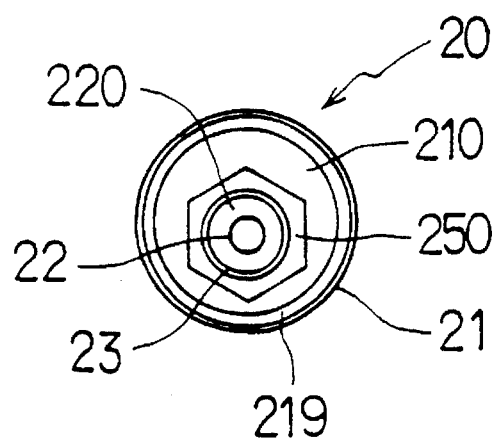
FIG. 15 is a sectional view taken substantially along the line B—B of FIG. 11.

FIG. 15 is a sectional view taken substantially along the line B—B of FIG. 11.

The motor body 100 includes a nozzle 262 for connecting the coolant circulating pipe 20 thereto, wherein the nozzle 262 is welded to the coolant container 13 and connected to the discharging coolant pipe 23 through a connecting pipe 230 as shown in FIGS. 9 and 11.

Speciffically, the nozzle 262 is conncted to the one end 2301 of the conecting pipe 230 with a tube fitting 26, and the discharging coolant pipe 23 is connected to the other end 2302 of the connecting pipe 230 with a tube fitting 25. And one end 229 of the supplying coolant pipe 22 of the coolant circulating pipe 20 opens into the coolant container 13 through the nozzle 262.

In FIG. 11, the reference numbers 200, 231, 261, 291 and 292 designate a connecting pipe for connecting outer tube 21 to the motor body 100, a spacer for fixing the supplying coolant pipe 22 into the connecting pipe 230, a right-hand nut of the tube fitting 26, a cramp with O-ring for connecting the outer pipe 21 of the coolant circulating pipe 20 to the first coolant tank 201 after sealing, and a cramp for connecting the outer pipe 21 of the same to the connecting pipe 200 after sealing, respectively.

Figure 16:
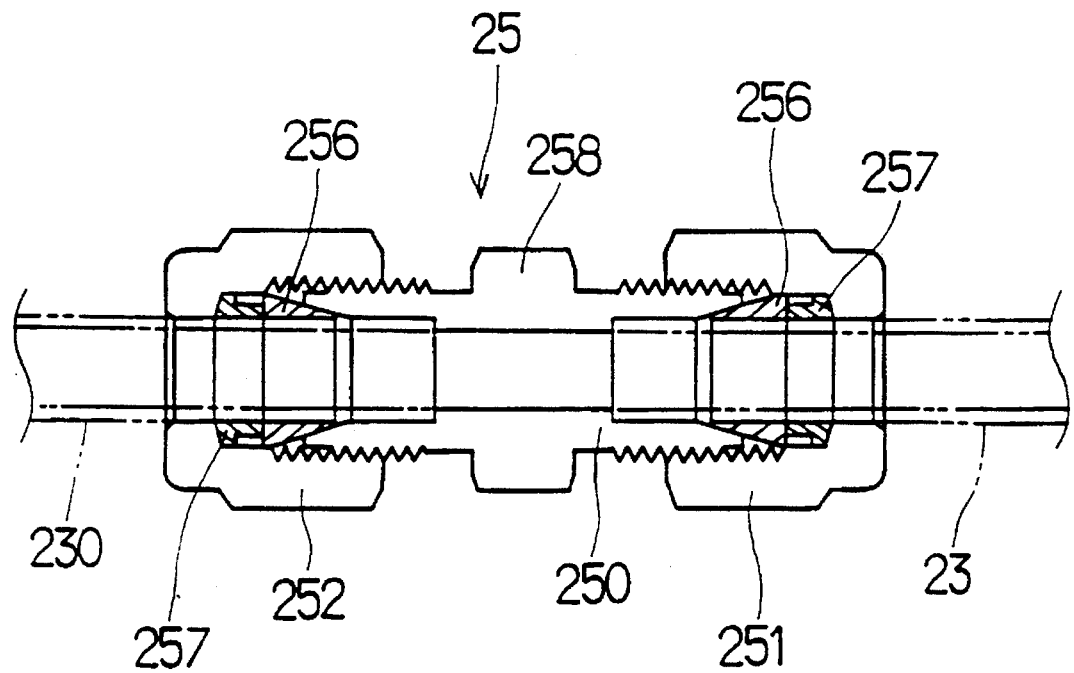
FIG. 16 is a sectional view of a tube fitting of the superconducting motor according to the third embodiment of the present invention.

As shown in FIG. 16, the tube fitting 25 is constituted by a central block 250 and a right- and a left-hand nuts 251, 252 provided on both sides of the central block 250, wherein each of the nuts 251 and 252 is provided with a hole piercing through it. A front ferrule 256 in the form of a ring tapering in the direction of the central block 250 and a back ferrule 257 are provided between each of the nuts 251 and 252 and the central block 250. The opening portions of the central block 250 are tapering in the inside direction.

Figure 14:
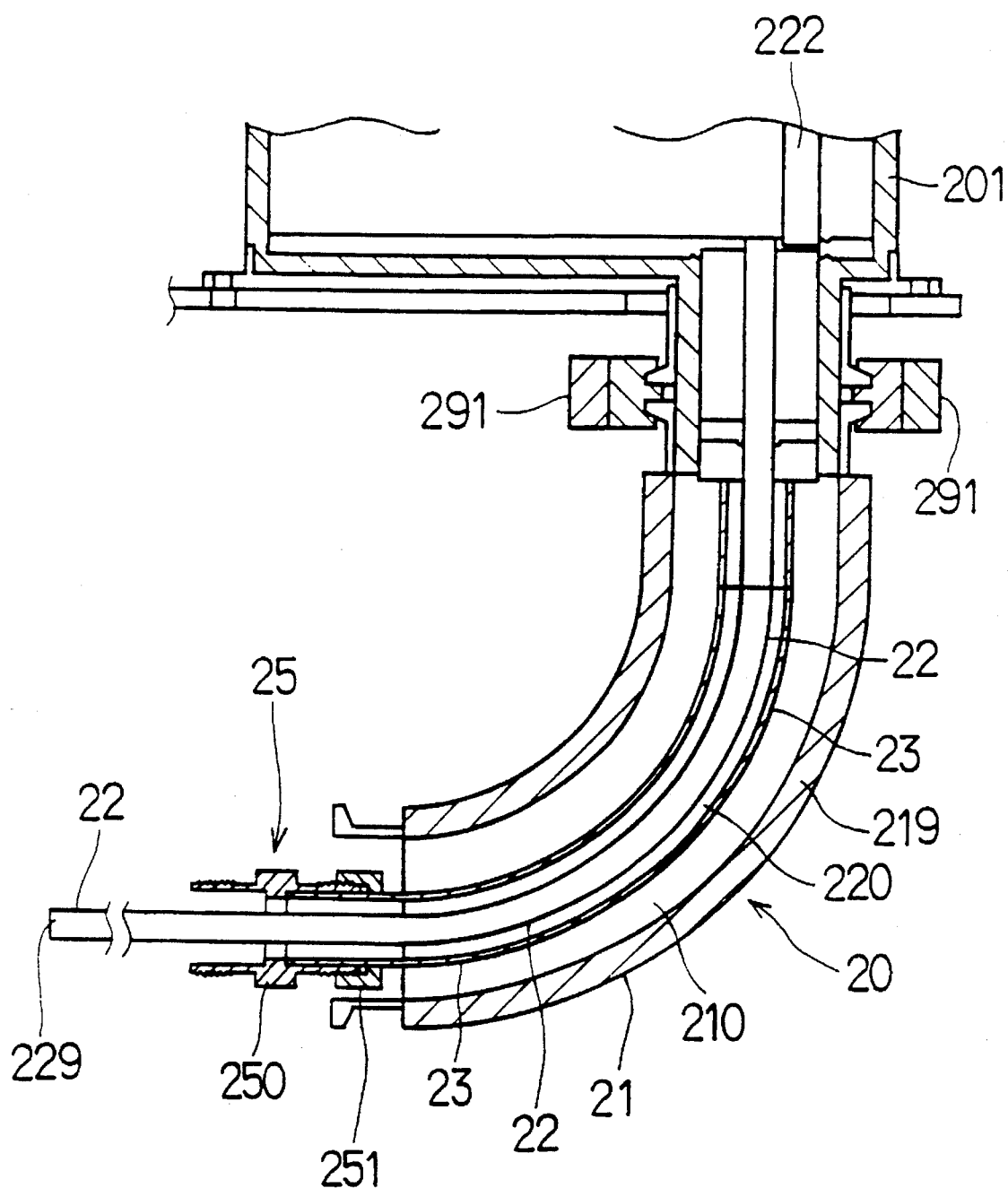
FIG. 14 is a sectional view of a coolant circulating pipe of the superconducting motor when separated from a motor body according to the third embodiment of the present invention.

As shown in FIG. 11, 14 and 16, when the discharging coolant pipe 23 and the connecting pipe 230 are connected with the tube fitting 25, the supplying and discharging coolant pipes 22, 23 are inserted into the right-hand nut 251 and the above discharging coolant pipe23 comes in contact with the central projection 258 of the central block 250. On the other hand, as shown in FIG. 11, the connecting pipe 230 is inserted into the left-hand nut 252 and comes in contact with the central projection 258.

The front ferrule 256 and the back ferrule 257 are pressed in the direction of the central block 250 by tightening the right- and left-hand nuts 251, 252, respectively. The end of the front ferrule 256 is fitted on the central block 250, and consequently, they stick to each other. Thus, the discharging coolant pipe 23 and the connecting pipe 230 are airtightly connected with the tube fitting 25.

Since the tube fitting 26 has the same structure as the tube fitting 25, it also allows the nozzle 262 and the right-hand nut 261 to be connected airtightly to the connecting pipe 230.

The way the first and second coolant tanks 201, 202 are removed from the motor body 100 will now be described.

As shown in FIG. 9 and 11, first, air is introduced into the vacuum portion 210 interposed between the discharging coolant pipe 23 and the outer tube 21 to be kept at normal pressure. Then, the cramp with a O-shaped ring 292 is removed.

After Wilson seal 296 (see FIG. 11) is loosen, the outer connecting pipe 200 is slided in the direction of the motor body 100 and the tube fitting 25 between the discharging coolant pipe 23 and the connecting pipe 230 is exposed (see FIG. 14). Then, as shown in FIG. 16, the left-hand nut 252 is loosened to make the tube fitting 25 and the connecting pipe 230 separable.

Next, the coolant circulating pipe 20 is slided in the direction where it is pulled apart from the motor body 100 (in the right direction of FIGS. 9 and 11). The first coolant tank 201, the outer tube 21, the discharging coolant pipe 23, the supplying coolant pipe 22 and the central block 250 are all separated from the motor body 100 as a unit (see FIG. 14).

When each of the first and second coolant tanks 201, 202 is put together, the above procedure is taken in reverse order.

The advantages of the present embodiment will now be described.

In the superconducting motor 1 of the present embodiment, the coolant container 13 is filled with liquid nitrogen through the supplying coolant pipe 22. As a result, the superconductors 11 of the magnet portions 10 are cooled below the critical temperature thereof. The magnetizing coils 12 are similarly cooled.

Next, the pulse current 120 is supplied by a pulse current source (see FIG. 12). This produces magnetic fields in the magnetizing coils 12, and the magnetic flux 110 generated from the magnetizing coils is fixed to the pinning points 111 of the superconductors 11 as shown in FIG. 21. The superconductors 11 are thus magnetized.

When the motor is being driven, electric current is supplied from a current source to the armature 15 through the brushes 17 and the commutators 18. A Lorentz force acts on the current through the armature 15 by means of the magnetic flux 110 from the superconductors 11.

In other words, the flowing directions of the electric current at the disc-shaped armature 15 are divided into the same number of portions as the magnetic portions 10, and the current of each portion alternately flows in the radial direction depending on the direction of the magnetic field to produce torque in the same direction. This causes the armature 15 to rotate, making it possible to take out the motor output through the rotative shaft 16 connected to the armature 15.

The temperature of the coolant 130 rises while circulating through the coolant container 13 to become a gas coolant. The gas coolant returns to the first and second coolant tanks 201, 202 again through the discharging coolant pipe 23.

FIG. 12 shows how the superconductors 11 are magnetized by appllying the pulse current 120. The flowing direction of the pulse current 120 is the same at the magnetizing coils 12 facing each other on both sides of the armature 15 while the current flows in opposite directions at the magnetizing coils 12 adjoining each other in the circumferential direction of the armature 15.

As a result, the magnetic flux 110 generated from the magnetized superconductors 11 is perpendicular to the armature 15 between the superconductors 11 facing each other on both sides of the armature 15 and is in the form of a closed curve among the superconductors 11 adjoining each other in the circumferential direction of the armature 15.

Accordingly, the superconductors 11 are magnetized by the magnetizing coils 12 in the directions as shown in FIG. 12. The di rection of the magnetic flux 110 is fixed. This prevents the magnetic flux 110 from leaking to the outside. It is therefore possible to efficiently fix the magnetic flux 110 to the superconductors 11.

The magnetic flux 110 is more efficiently fixed to the superconductors 11 when utilizing a ferromagnetic alloy (a yoke material) whose principal constituent elements are Fe, Ni and Co.

As shown in FIG. 21, the magnetic flux 110 produced by the pulse current 120 is fixed to the pinning points 111 in the superconductors 11. This makes it possible to magnetize the superconductors 11 without applying electric current to the superconductors 11. Therefore, no quenching occurs in the superconductors 11.

FIG. 22 shows the waveform of the pulse current 120 flowing through the magnetizing coils 12.

The rising time of the coil current is 2.5 ms and the current disappears 15 ms later. Since the current flows through the magnetizing coils 12 for a very short time, only a small amount of Joule heat is generated and boiling of the coolant can be avoided.

The magnetic fields at the superconductors 11 magnetized by the pulse current 120 are attenuated over time. Ten times of an elapsed time causes the magnetic fields to attenuate by 2 to 3 percent. So, the pulse current 120 is applied to the magnetizing coils 12, for example, every day. Thus, the superconductors 11 always maintain large magnetic flux and therefore the magnetic fields.

The pulse current 120 is supplied from an external pulse current source. This makes it possible to control the magnetic fields at the superconductors 11 through the external pulse current source. Therefore, the motor can be efficiently operated independently of the pulse power source. By controlling the magnitude of the magnetic fields, desired motor output can be obtained.

The critical temperature of the superconductors 11 used in the present embodiment is about 90K. It is therefore possible to use liquid nitrogen as the coolant 130. Liquid nitrogen is inexpensive and easy to handle. Thus, a superconducting motor 1 which requires low operating cost and has a simple structure can be obtained.

In the superconducting motor 1 of the present embodiment, the first and second coolant tanks 201, 202 are separately provided from the motor body 100 and each of these tanks and the body are connected with the coolant circulating pipe 20. This allows the first and second coolant tanks 201, 202 to be arranged more freely.

Further, since the superconducting motor has a simple structure and the sealing material used therein is reduced, the superconducting motor 1 can be easily taken apart or put together.

The coolant circulating pipe 20 of the preset embodiment is double-piped. Specifically, the pipe is constituted by a supplying coolant pipe 22, a discharging coolant pipe 23, a vacuum portion 210, an insulating material 219 and an outer tube 21, all of which are almost coaxially provided outward in the above order. The inflow of outside heat is mostly suppressed by the vacuum portion 210 and the insulating material 219, and the coolant in the discharging coolant pipe 23, part of which is a gas coolant, also insulates the supplying coolant pipe 22 from outside heat.

The tube fitting 25, which does not require any special tools and therefore with which taking apart and putting together can be done only with one's hands, is used for connecting the connecting pipe 230 and the discharging coolant pipe 23.

The outer tube 21 is bellows-shaped and therefore excellent in flexibility and pliability.

Accordingly, the coolant circulating pipe 20 can be extended to the outside, and this makes it possible to connect the motor body 100 to each of the first and second coolant tanks 201, 202 separately provided therefrom.

Thus, the superconducting motor of the present embodiment can be easily taken apart and put together.

As described above, the present embodiment provides a superconducting motor which has no quenching at the superconductors therein and which can be easily taken apart and put together, and what is more, operated efficiently.

Embodiment 4

Characteristics of the superconducting motor of the third embodiment of the present invention will now be described with reference to FIG. 23 through FIG. 25.

In order to magnetize superconductors in the superconducting mo tor, first, a pulse current is applied to the magnetizing coils. The pulse current applied thereto causes a coil current to flow through the magnetizing coils and to generate pulse magnetic fields in the magnetizing coils. The superconductors in the puls magnetic fields become magnetized just like a normal magnet. As a result, an electric current flowing through the armature is energized and causes a rotative shaft of the superconducting motor to rotate, making it possible to take out a motor output therefrom.

The characteristics of the motor is, therefore, described by the torque and rotation speed of the rotative shaft. When the characteristics are evaluated, a deformation gauge type torque meter and a loading motor are connected to the rotative shaft of the superconducting motor in this order.

The torque of the rotative shaft is measured by the above torque meter and the rotation speed of the same by an optical reflection rotation meter.

The measurement described below was conducted utilizing the superconducting motor accrding to the third embodiment of the present invention, and the superconductors therein were magnetized by a pulse current having the same waveform as shown in the third em bodiment.

Figure 23:
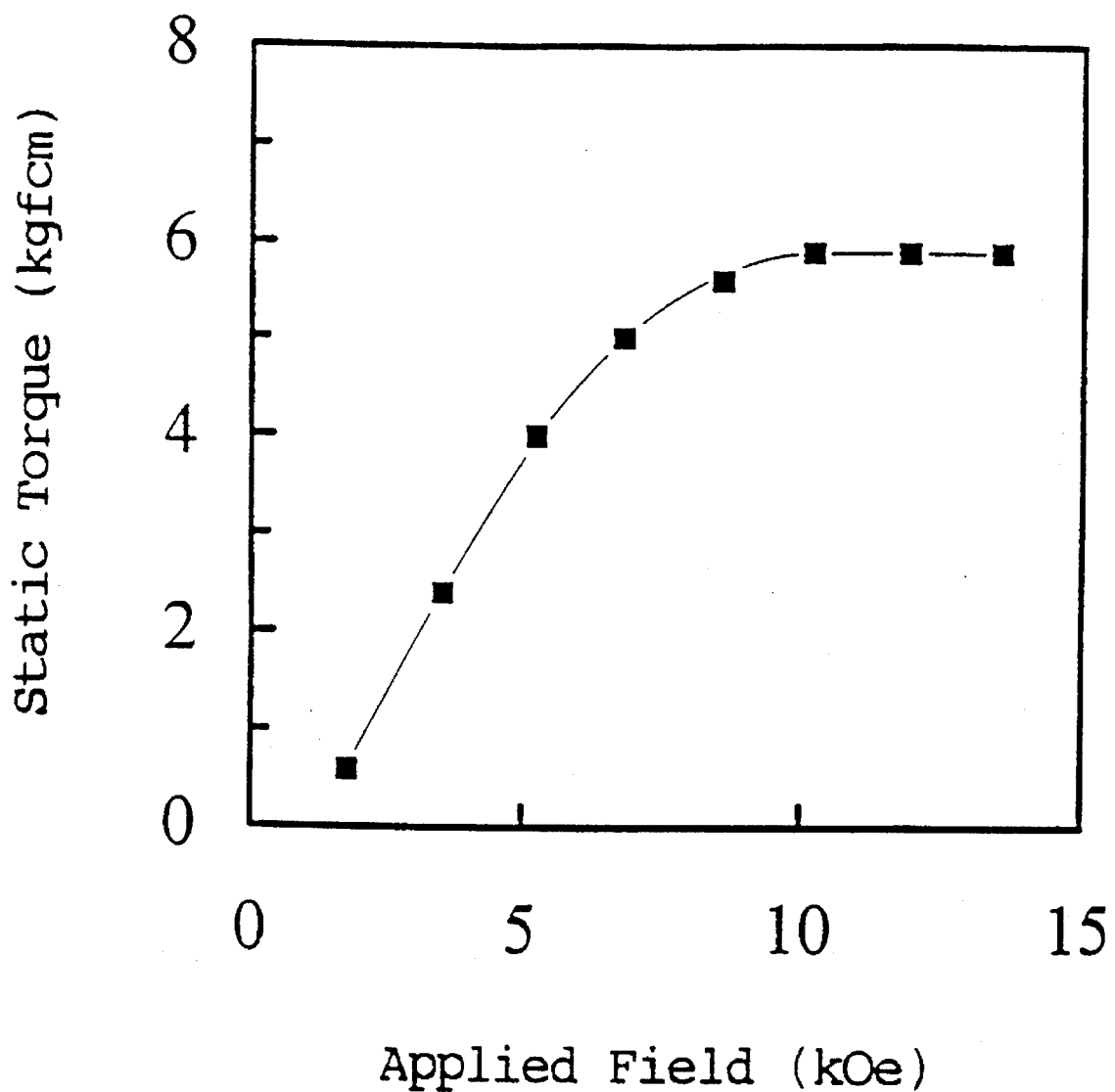
FIG. 23 is a diagram illustrating the relation between applied magnetic field and static torque of a shaft according to a fourth embodiment of the present invention.

FIG. 23 shows the relation between the puls magnetic field (applied magnetic field) and the static torque of the rotative shaft provided in the superconducting motor.

It is seen that until the puls magnetic field exceeds 10 kOe where the superconductors are magnetized to saturation, the static torque increases as the magnitude of the puls magnetic field being increased. This means that in the superconducting motor, the motor output can be controlled by adjusting the magnitude of the pulse magnetic field to magnetize the superconductors.

Figure 24:
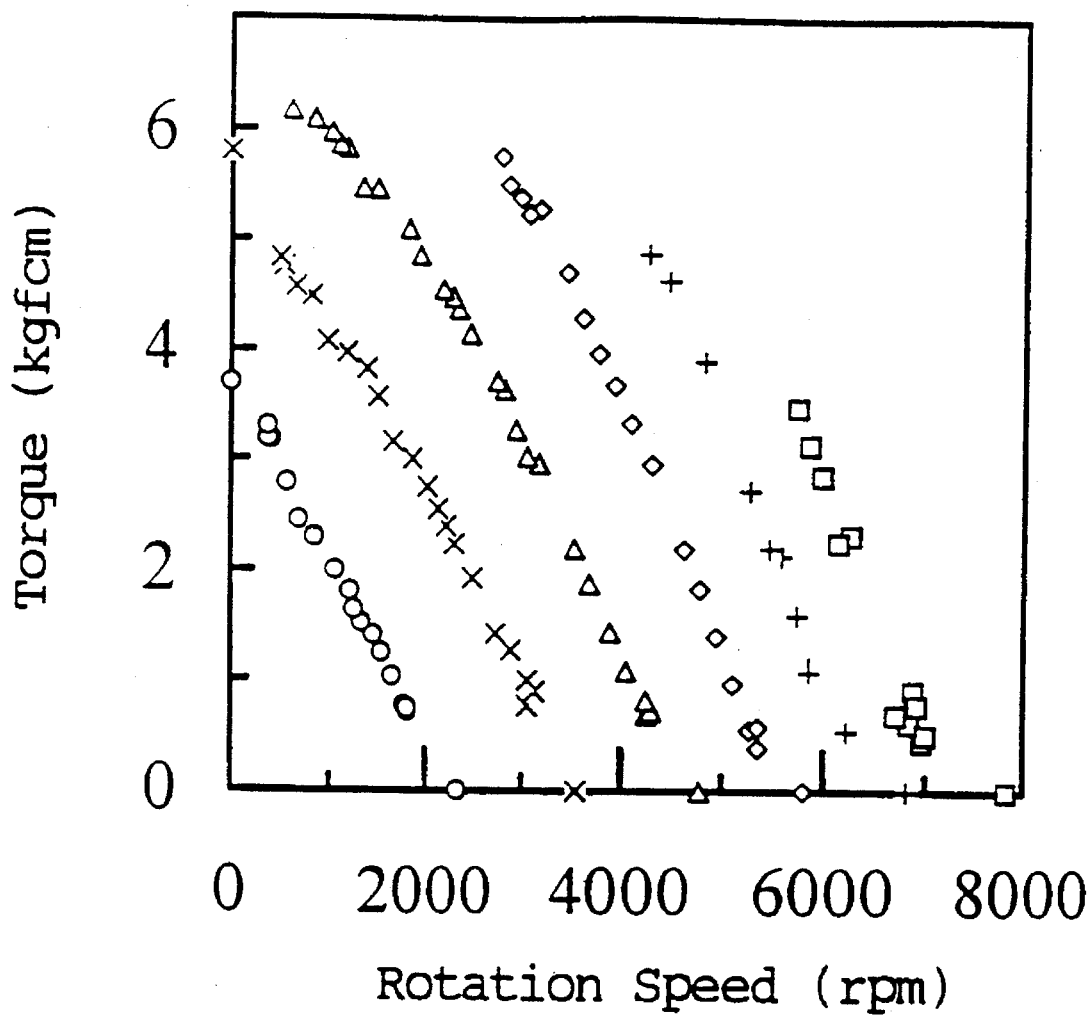
FIG. 24 is a diagram illustrating the relation between rotation speed of a shaft and torque according to the fourth embodiment.

FIG. 24 shows the relation between the rotation speed and the torque of the rotative shaft under a constant voltage control. As shown below FIG. 24, the voltage is between 10 V and 35 V.

Specifically, just like in the case of a conventional direct-current motor, even in the superconducting motor the value of the torque is reduced linearly as rotation speed is increased. From this it can be said that the superconducting motor functions in the same way as a conventional direct-current motor utilizing permanent m nets.

Figure 25A:
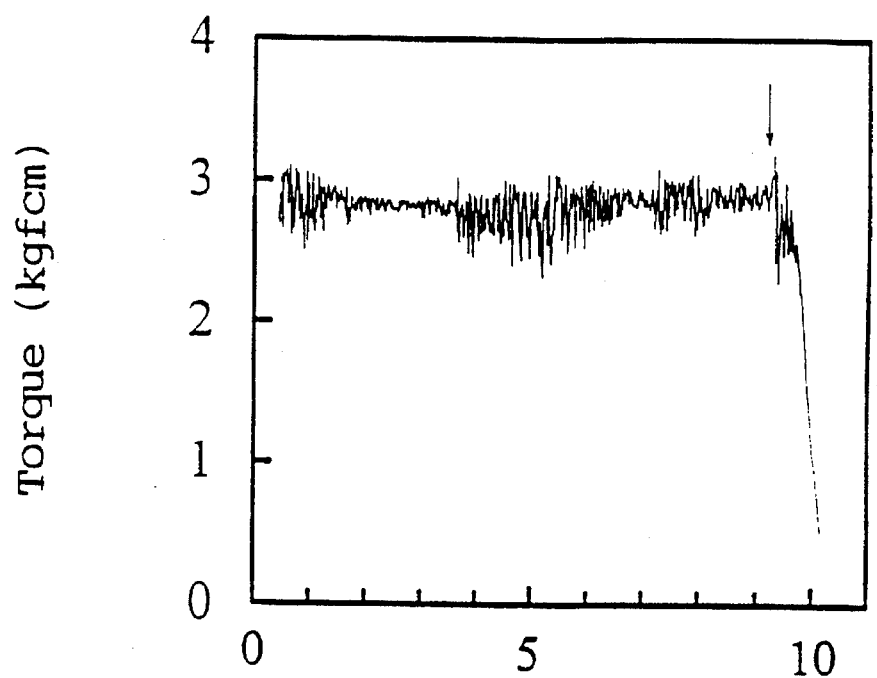
FIG. 25(a) and 25(b) are diagrams illustrating the variation of torque and rotation speed of a shaft against time after magnetization of the superconducting motor according to the fourth embodiment of the present invention.
Figure 25B:
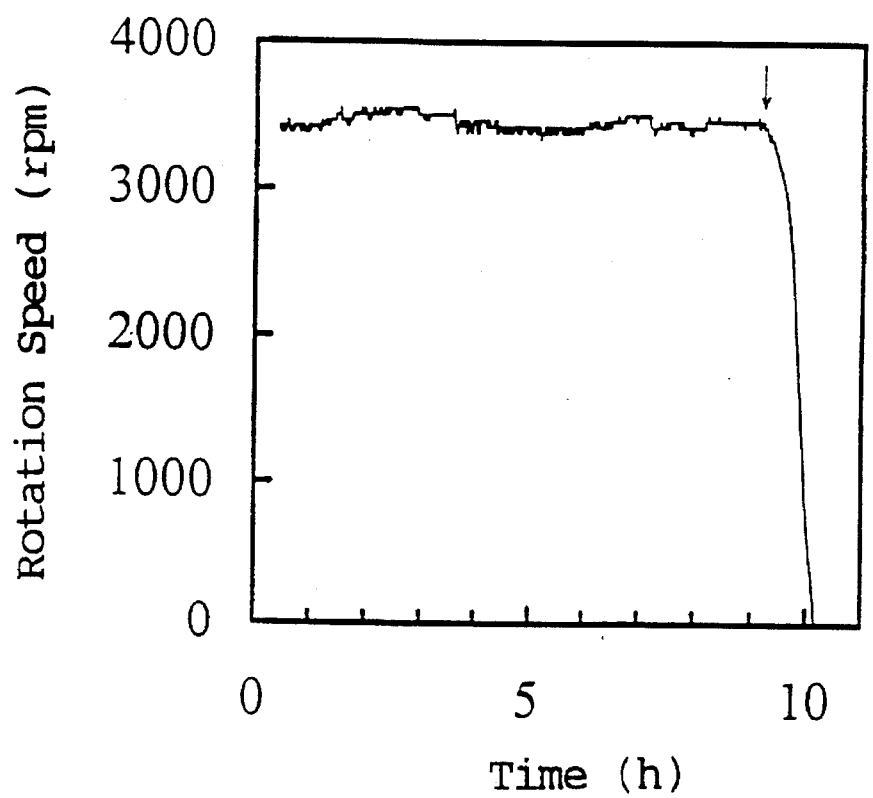

FIG. 25 shows the torque and the rotation speed of the rotative shaft when the superconducting motor is being operated continuously under a constant current control and a constant load condition.

Specifically, first, the superconductors at magnet portions are kept in a superconducting state by filling coolant containers with liquid nitrogen from the first and second coolant tanks. Then, after the superconductors are magnetized by puls magnetization, the superconducting motor is driven until the superconducting state of the superconductors is broken by vaporization of liquid nitrogen (see the arrows of FIG. 25). FIG. 25 shows the variation of (a) torque and (b) rotatin speed against time after magnetization.

FIG. 25 (a) and (b) show the superconducting motor stably operates as long as the superconductors remain in a superconducting state at the temperature below the critical temperature thereof. As shown in FIG. 25 (a), the value of the torque is maintained around 3 kgfcm until the time indicated by the arrow. This means the motor performance is not substantially affected by the attenuation of magnitude of magnetic fields of superconductors. FIG. 25 (b) also shows the rotation speed of the rotative shaft is maintained around 3500 rpm.

Accordingly, the superconducting motor can operate stably and continuously.

Embodiment 5

Figure 26:
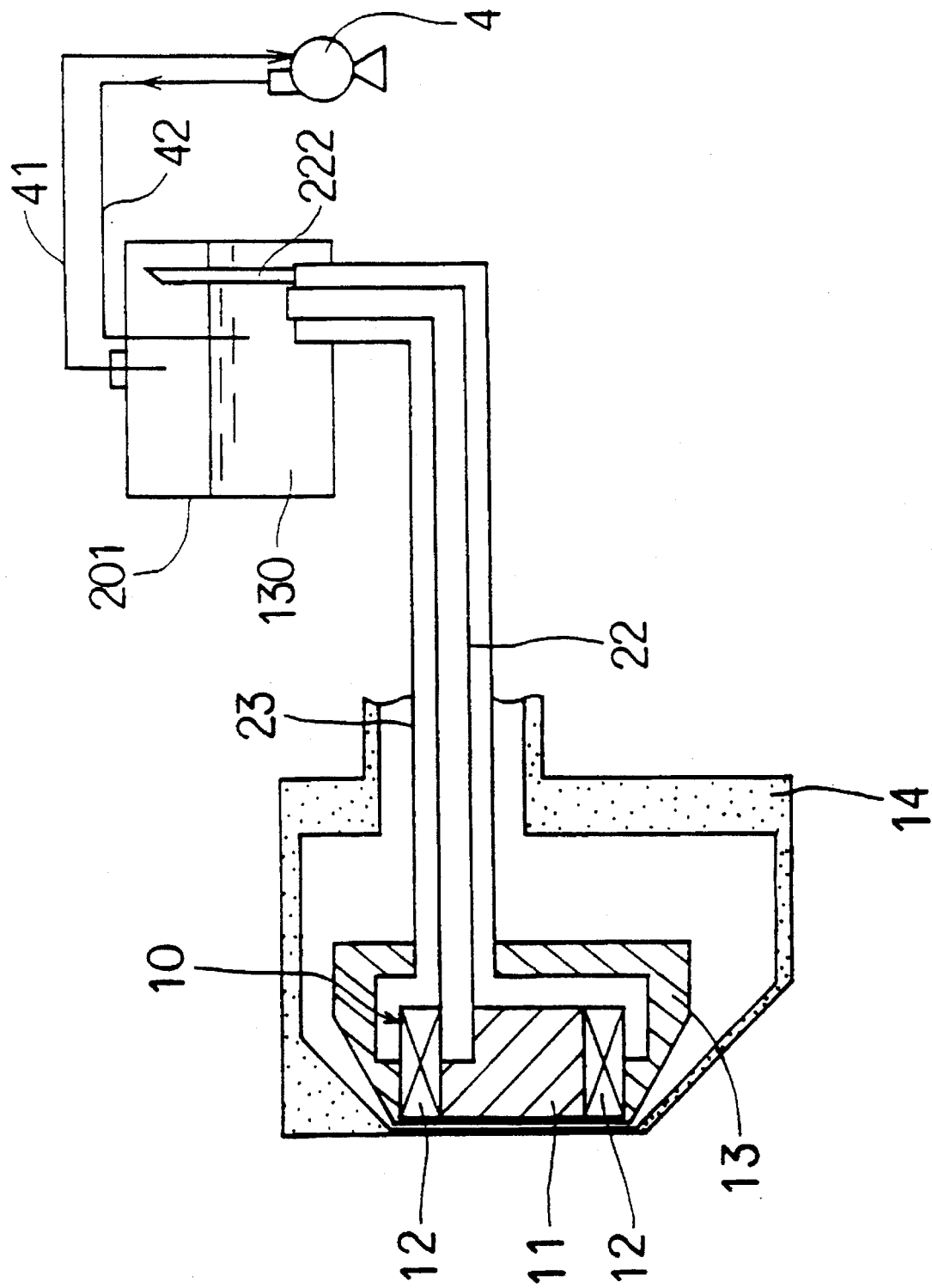
FIG. 26 illustrates major parts of a superconducting motor according to the fifth embodiment of the present invention.

FIG. 26 shows the fifth embodiment of the present invention which describes how a coolant gas in a discharging coolant pipe 23 of a superconducting motor 1 according to the third embodiment is cooled and reused as a coolant 130.

The present embodiment also refers only to a first coolant tank 201.

As sown in FIG. 26, the coolant 130 is supplied from the first coolant tank 201 provided separately from the motor body 100 to the coolant container 13 through the supplying coolant pipe 22.

The coolant 130 partly turns into a gas coolant because the temperature thereof increases while cooling the superconductors 11. The coolant gas is discharged into the first coolant tank 201 through the discharging coolant pipe 23 and the discharging nozzle 222.

Two pipes 41, 42 extended from a refrigerator 4 are connected to the first coolant tank 201 and a gas coolant in the first coolant tank 201 is discharged into the refrigerator 4 through the pipe 41. The gas coolant is cooled in the refrigerator 4 to again become the coolant 130 in a liquid phase. Then, the coolant 130 is discharged again into the first coolant tank 201. Thus, the gas coolant is circulated between the refrigerator 4 and the first coolant tank 201.

According to the present embodiment, it is possible to always maintain the temperature of the coolant 130 in the first coolant tank 201 to be constant. This allows the superconductors 11 to be at a constant low temperature.

Various details of the invention may be changed without departing from its spirit nor its scope. Furthermore, the foregoing description of the embodiments according to the present invention is provided for the purpose of illustration only, and not for the purpose of limiting the invenion as defined by the appended claims and their equivalents.

What is claimed is:

1. A superconducting motor comprising an armature provided on a rotative shaft, magnet portions disposed opposite to said armature, a coolant container for containing said magnet portions and coolant, coolant pipes connected to said coolant container for supplying the coolant, wherein each of said magnet portions comprises a superconductor and a magnetizing coil wound around it and wherein lead wires for supplying a pulse current for magnetization are connected to said magnetizing coils.

2. The superconducting motor according to claim 1, wherein said magnet portions are disposed on one side of said armature.

3. The superconducting motor according to claim 1, wherein said magnet portions are disposed on both sides of said armature.

4. The superconducting motor according to claim 1, wherein said magnet portion is provided in singularity or plurality in the rotational direction of said armature.

5. The superconducting motor according to claim 1, wherein said magnetizing coils are made of superconducting wires.

6. The superconducting motor according to claim 1, wherein said lead wires are spirally twisted together.

7. The superconducting motor according to claim 1, wherein said lead wires are routed through said coolant pipes.

8. The superconducting motor according to claim 1, wherein said superconductors are superconducting oxides including Y, Ba and Cu produced by a melt-processing technique.

9. The superconducting motor according to claim 1, wherein said coolant is a liquid coolant selected from among a group consisting of liquid nitrogen, liquid argon, liquid air, liquid oxygen, liquid methane and liquid krypton.

10. The superconducting motor according to claim 1, wherein said coolant is a gas coolant selected from among a group consisting of cooled helium gas, hydrogen gas and neon gas.

11. The superconducting motor according to claim 10, wherein said gas coolant is cooled by a refrigerator and is circulated between said refrigerator and said coolant container.

12. The superconducting motor according to claim 1, wherein said coolant container is disposed in a vacuum container.

13. A superconducting motor comprising a motor body and a first and second coolant tanks;
wherein said motor body comprises an armature provided on a rotative shaft, magnet portions disposed opposite to said armature, coolant containers for containing said magnet portions and coolant, coolant pipes connected to said coolant containers for supplying the coolant, wherein each of said magnet portions comprises a superconductor and a magnetizing coil wound around it and wherein lead wires for supplying a pulse current for magnetization are connected to said magnetizing coils;
and wherein the coolant container provided on both sides of the armature are connected to the first and the second coolant tanks re spectively by means of coolant circulating pipes and wherein said coolant circulating pipe comprises a supplying coolant pipe for supplying the coolant to each of the coolant container from the first and the second coolant tanks and a discharging coolant pipe provided at the outer periphery of said supplying coolant pipe leaving a spacing therebetween for discharging a coolant from each of the coolant containers into the first and second coolant tanks.

14. The superconducting motor according to claim 13, wherein each of said first and second coolant tanks is provided on the top of said motor body.

15. The superconducting motor according to claim 13, wherein a bellows-shaped outer tube is provided at the outer periphery of said dischaging coolant pipe with an insulating material therebetween.

16. The superconducting motor according to claim 13, wherein said motor body includes a nozzle connected to said coolant circulating pipes wherein one end of the supplying coolant pipe of said coolant circulating pipes opens into the coolant container through said nozzle and the discharging coolant pipe of said coolant circulating pipes is fitted removably into said nozzle.

17. The superconducting motor according to claim 16, wherein said nozzle and said discharging coolant pipe are connected with a connecting pipe and each of the nozzle and the discharging coolant pipe is connected to said connecting pipe with a tube fitting.

18. The superconducting motor according to claim 13, wherein said magnet portion is provided in singularity or plurality in the rotational direction of said armature.

19. The superconducting motor according to claim 13, wherein said magnetizing coils are made of superconducting wires.

20. The superconducting motor according to claim 13, wherein said superconductors are superconducting oxides including Y, Ba and Cu produced by a melt-processing technique.

21. The superconducting motor according to claim 13, wherein said coolant is a liquid coolant selected from among a group consisting of liquid nitrogen, liquid argon, liquid air, liquid oxygen, liquid methane and liquid krypton.

22. The superconducting motor according to claim 13, wherein said coolant is a gas coolant selected from among a group consisting of cooled helium gas, hydrogen gas and neon gas.

23. The superconducting motor according to claim 13, wherein said coolant container is disposed in a vacuum container.

24. The superconducting motor according to claim 13, wherein said lead wires are spirally twisted together.

25. The superconducting motor according to claim 13, wherein the gas coolant discharged into said coolant tank is cooled by a refrigerator and is circulated between said refrigerator and said coolant tank.

26. The superconducting motor according to claim 13, wherein said lead wires are routed through said coolant pipes.

* * * * *